US011996600B2

(12) United States Patent
Hollenbeck et al.

(10) Patent No.: US 11,996,600 B2
(45) Date of Patent: May 28, 2024

(54) HOLLOW METAL WAVEGUIDES HAVING IRREGULAR HEXAGONAL CROSS SECTIONS WITH SPECIFIED INTERIOR ANGLES

(71) Applicant: Optisys, Inc., West Jordan, UT (US)

(72) Inventors: Michael Hollenbeck, West Jordan, UT (US); Robert Smith, West Jordan, UT (US)

(73) Assignee: Optisys, Inc., West Jordan, UT (US)

(*) Notice: Subject to any disclaimer, the term of this patent is extended or adjusted under 35 U.S.C. 154(b) by 130 days.

(21) Appl. No.: 17/562,862

(22) Filed: Dec. 27, 2021

(65) Prior Publication Data

US 2022/0190456 A1 Jun. 16, 2022

Related U.S. Application Data

(63) Continuation-in-part of application No. 16/684,153, filed on Nov. 14, 2019, now Pat. No. 11,211,680.

(60) Provisional application No. 62/767,481, filed on Nov. 14, 2018.

(51) Int. Cl.

*H01P 3/123* (2006.01)
*H01P 1/02* (2006.01)
*H01P 3/12* (2006.01)
*H01P 5/16* (2006.01)

(52) U.S. Cl.

CPC .............. *H01P 3/123* (2013.01); *H01P 1/022* (2013.01); *H01P 3/12* (2013.01); *H01P 5/16* (2013.01)

(58) Field of Classification Search

CPC ........... H01P 3/123; H01P 3/12; H01P 11/002
USPC .......................................................... 333/239
See application file for complete search history.

(56) References Cited

U.S. PATENT DOCUMENTS

| | | | |
|---|---|---|---|
| 2,409,913 | A | 2/1944 | Tonks |
| 3,396,350 | A | 8/1968 | Krank et al. |
| 3,777,286 | A | 12/1973 | Cramm et al. |
| 4,297,658 | A | 10/1981 | Treczka |
| 4,467,294 | A | 8/1984 | Janky et al. |
| 6,018,315 | A | 1/2000 | Ince et al. |
| 6,137,450 | A | 10/2000 | Bhattacharyya et al. |
| 6,198,730 | B1 | 3/2001 | Hogberg et al. |
| 6,501,434 | B1 | 12/2002 | Hollenstein et al. |
| 7,480,435 | B2 | 1/2009 | Brist et al. |

(Continued)

FOREIGN PATENT DOCUMENTS

| | | | |
|---|---|---|---|
| DE | 102015103983 | A1 | 9/2016 |
| FR | 3087954 | A1 | 10/2018 |

(Continued)

OTHER PUBLICATIONS

Machine translation prepared on Jan. 27, 2020, by the European Patent Office for Publication No. WO 2017208153.

(Continued)

*Primary Examiner* — Benny T Lee
(74) *Attorney, Agent, or Firm* — TechLaw Ventures, PLLC; Terrence J. Edwards

(57) ABSTRACT

Antenna arrays and structures for propagating electromagnetic signals. A waveguide cross-section is disclosed that may be implemented as a hollow irregular hexagonal metal structure that receives an electromagnetic signal and propagates the electromagnetic signal through the hollow hexagonal metal structure. The waveguide may be fabricated using metal additive manufacturing techniques and include one or more downward facing and unsupported surfaces.

21 Claims, 17 Drawing Sheets

(56) References Cited

U.S. PATENT DOCUMENTS

| | | | |
|---|---|---|---|
| 9,253,925 | B1 | 2/2016 | Smith |
| 10,170,833 | B1 | 1/2019 | Hollenbeck et al. |
| 10,468,773 | B2 | 11/2019 | Hollenbeck et al. |
| 10,481,253 | B1 | 11/2019 | Hollenbeck et al. |
| 10,680,341 | B1 | 6/2020 | Anderson et al. |
| 11,189,897 | B2 | 11/2021 | Uemichi |
| 11,211,680 | B2 | 12/2021 | Hollenbeck et al. |
| 11,233,304 | B2 | 1/2022 | Hollenbeck et al. |
| 2012/0242428 | A1 | 9/2012 | Blech et al. |
| 2013/0033404 | A1 | 2/2013 | Abe |
| 2013/0321089 | A1 | 12/2013 | Ohashi et al. |
| 2016/0254579 | A1 | 9/2016 | Mills |
| 2020/0127358 | A1 | 4/2020 | de Rijk et al. |
| 2020/0161738 | A1 | 5/2020 | de Rijk et al. |
| 2020/0194855 | A1 | 6/2020 | Hollenbeck et al. |
| 2020/0194860 | A1 | 6/2020 | Hollenbeck et al. |
| 2020/0266510 | A1 | 8/2020 | Gomez et al. |
| 2021/0126332 | A1 | 4/2021 | Uemichi |

FOREIGN PATENT DOCUMENTS

| | | | |
|---|---|---|---|
| GB | 2275454 | B | 8/1994 |
| JP | 3750856 | B2 | 12/2005 |
| WO | 2017203568 | A1 | 11/2017 |
| WO | 2018199036 | A1 | 11/2018 |
| WO | 2020106774 | A2 | 5/2020 |

OTHER PUBLICATIONS

Machine translation prepared on Dec. 28, 2021, by Google Patents for Publication No. FR3087954A1.

Machine translation prepared on Dec. 28, 2021, by Google Patents for Publication No. WO 2017203568.

Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

Asao H et al. "Metal-plated plastic waveguide filter using injection molding process," 2003 IEEE MTT-S International Microwave Symposium Digest. (IMS 2003); [IEEE MTT-S International Microwave Symposium], New York, NY: IEEE, U.S., vol. 2, Jun. 8, 2003 (Jun. 8, 2003), pp. 941-944, XP010645060, DOI: 10.1109/MWSYM.2003.1212524 ISBN: 978-0-7803-7695-3.

D'Auria Mario et al. "3-D Printed Metal-Pipe Rectangular Waveguides," IEEE Transactions on Components, Packaging and Manufacturing Technology, IEEE, USA, vol. 5, No. 9, Aug. 21, 2015 (Aug. 21, 2015), pp. 1339-1349, XP011669774, ISSN: 2156-3950, DOI: 10.1109/TCPMT.2015.2462130 [retreived on Sep. 21, 2015].

"European Search Report and Written Opinion," Received for PCT Application No. PCT/US2019/061491, dated Jun. 27, 2022, 20 Pages.

"European Search Report and Written Opinion," Received for PCT Application No. PCT/US2019/062295, dated Jul. 25, 2022, 35 Pages.

English translation of WO 2018199036 prepared by Google Patents on Jan. 10, 2023 (https://patents.google.com/patent/WO2018199036A1/en?oq=WO+2018199036).

English translation of DE 102015103983 prepared by Google Patents on Jan. 10, 2023 (https://patents.google.com/patent/DE102015103983A1/en?oq=DE+102015103983).

English translation of JP 3750856 prepared by Google Patents on Jan. 10, 2023 (https://patents.google.com/patent/JP3750856B2/en?oq=JP+3750856).

N. Nathrath, et al. "Lightweight Intersatellitelink Antenna (LISA) operating at Ka-Band," Technical University of Munich, Institute of Astronautics, Munich, Germany, Published Apr. 12, 2010, Downloaded on Apr. 23, 2023 UTC from IEEE Xplore, 4 Pages.

HOLLOW METAL WAVEGUIDES HAVING IRREGULAR HEXAGONAL CROSS SECTIONS WITH SPECIFIED INTERIOR ANGLES

CROSS-REFERENCE TO RELATED APPLICATIONS

This application is a continuation-in-part of U.S. Pat. No. 11,211,680 B2, filed Nov. 14, 2019, issued Dec. 28, 2021, and entitled "HOLLOW METAL WAVEGUIDES HAVING IRREGULAR HEXAGONAL CROSS SECTIONS AND METHODS OF FABRICATING SAME," which claims the benefit under 35 U.S.C. § 119(e) of U.S. Provisional Patent Application No. 62/767,481 filed Nov. 14, 2018, and entitled "HOLLOW METAL WAVEGUIDES HAVING IRREGULAR HEXAGONAL CROSS-SECTIONS AND METHOD OF FABRICATING SAME," which are incorporated herein by reference in their entirety, including but not limited to those portions that specifically appear hereinafter, the incorporation by reference being made with the following exception: In the event that any portion of the above-referenced applications are inconsistent with this application, this application supersedes said above-referenced applications.

TECHNICAL FIELD

The disclosure relates generally to systems, methods, and devices related to antennas and specifically relates to the waveguides and other elements of an antenna arrays, waveguide components, and waveguide assemblies.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency multiplied by the speed of light $\lambda=c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high-performance applications exist for antennas that are less known outside the industry, such as electronic warfare and ISR (information, surveillance, and reconnaissance) to name a couple.

High performance antennas are required when high data rate, long range, or high signal to noise ratios are required for a particular application. In order to improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length a signal must travel in the passive structure (total loss is loss per length multiplied by the total length), multi-piece fabrication, antenna geometry, and others. These loss properties are all related to specific design and fabrication choices that an antenna designer must make when balancing size, weight, power, and cost performance metrics (SWaP-C). Gain of an antenna structure is a function of the area of the antenna and the frequency of operation. To create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Every physical component is designed with the limitations of the fabrication method used to create the component. Antennas and RF components are particularly sensitive to fabrication method, as the majority of the critical features are inside the part, and very small changes in the geometry can lead to significant changes in antenna performance. Due to the limitations of traditional fabrication processes, hollow metal waveguide antennas and RF components have been designed to be assembled as multi-piece assemblies, with a variety of flanges, interfaces, and seams. All of these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide antennas and RF components in the realm of applications where size, weight, and cost are less important than overall performance.

Accordingly, conventional the waveguides have been manufactured using conventional subtractive manufacturing techniques which limit specific implementations for the waveguides to the standard rectangular, square, and circular cross-sectional geometries that have the limitations described above. Additive manufacturing techniques provide opportunities, such as integrating the waveguide structures with other RF components such that a plurality of RF components may be formed in a smaller physical device with improved overall performance. However, the process of fabricating a traditional rectangular, square, or circular the waveguide structure in additive manufacturing typically leads to suboptimal performance and increased total cost in integrated the waveguide structures. Novel cross-sections for the waveguide structures that take advantage of the strengths of additive manufacturing will allow for improved performance of antennas and RF components while reducing total cost for a complex assembly.

It is therefore one object of this disclosure to provide the waveguide structures that may be optimally fabricated with three-dimensional printing techniques (aka additive manufacturing techniques). It is a further object of this disclosure to provide the waveguide structures that include angle specific transitions in a waveguide structure. It is a further object of this disclosure to provide the waveguide structures that are integral with other RF components.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
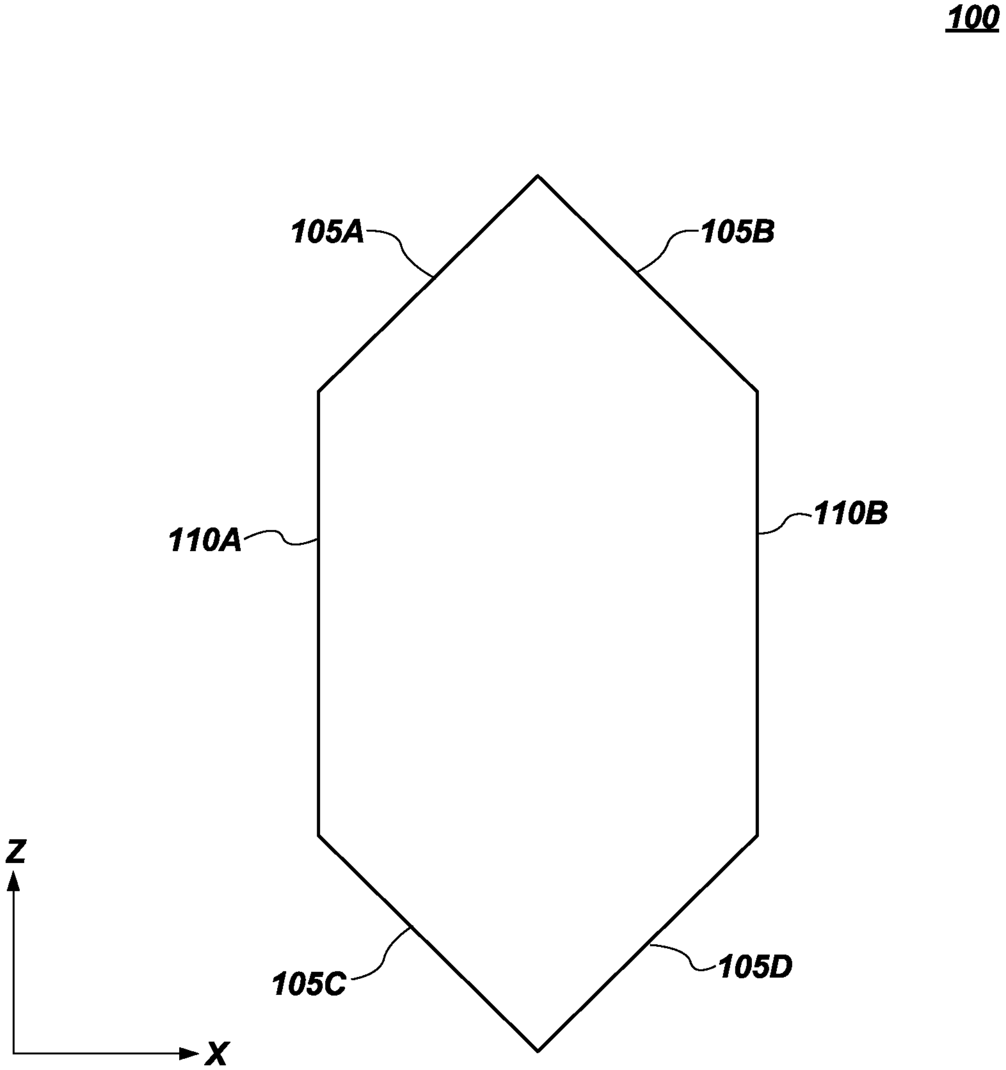
FIG. 1 illustrates an embodiment of a cross section of an irregular hexagonal waveguide.

Disclosed herein are systems, methods, and devices for improved waveguides that may be implemented in antenna arrays, waveguide components, and waveguide assemblies. Further disclosed herein are combiner structures that comprise a combiner configured to combine two or more electromagnetic signals received from two or more waveguides. The combiner combines the two or more electromagnetic signals into a single waveguide cavity. The combiner structures and waveguides disclosed herein are optimized for metal additive manufacturing (i.e., three-dimensional metal printing).

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Before the structure, systems, and methods for integrated marketing are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It is also noted that many of the figures discussed herein show air volumes of various implementations of the waveguides, the waveguide components, and/or the waveguide transitions. In other words, these air volumes illustrate negative spaces of the components within a fabricated element which are created by a metal skin installed in the fabricated element, as appropriate to implement the functionality described. It is to be understood that positive structures that create the negative space shown by the various air volumes are disclosed by the air volumes, the positive structures including a metal skin and being formed using the additive manufacturing techniques disclosed herein.

For the purposes of this description as it relates to a metal additive manufacturing system, the direction of growth over time is called the positive z-axis, or "zenith" while the opposite direction is the negative z-axis or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the "overhang angle," θ ("theta").

The term "downward facing surface" is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: $0° < \theta < 90°$. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

FIG. 1 illustrates a cross-sectional view of a waveguide 100. The waveguides 100 described herein include structures configured for guiding electromagnetic energy waves. The waveguides described herein are configured to guide waves with minimal loss of energy by optimally orienting overhang angles during fabrication to minimize surface roughness and reproduce the designed waveguide cross sectional geometry using an additive manufacturing process. In most cases, the waveguides 100 described herein define a hollow space wherein electromagnetic energy can pass through. The geometry of a waveguide enables proper orientation of the electromagnetic wave with respect to adjacent waveguide features such that a proper impedance transition can be achieved in a complex array, component, or assembly. The frequency bandwidth of operation of the electromagnetic wave in the waveguide may dictate the overall size and dimensions of the waveguide. The waveguides described herein may be optimized for broadband energy transmission in the fundamental mode of operation.

The cross-sectional view of the waveguide 100 illustrated in FIG. 1 depicts the hollow air space within the cavity of the waveguide 100. The lines illustrated in FIG. 1 depict the border between the hollow air space (defined by the irregular hexagonal geometry) and the beginning of the metal waveguide structure (not shown, the metal structure is located exterior to the irregular hexagonal geometry). Thus, the lines depicted in FIG. 1 illustrate the edge of the metal structure that defines the interior space of the hollow waveguide 100. The geometry of the waveguide 100 is optimized for propagating an electromagnetic signal, and the electromagnetic signal is guided through the irregular hexagonal air space illustrated in FIG. 1.

The waveguide 100 illustrated in FIG. 1 comprises an irregular hexagonal geometry. The waveguide 100 includes a plurality of sides. As shown in FIG. 1, the waveguide 100 includes a first side 105A and a second side 105B which are symmetrical with identical lengths. The waveguide 100 further includes a third side 105C and a fourth side 105D which are also symmetrical with identical lengths. As shown in FIG. 1, each of sides 105A-105D are symmetrical with identical lengths. However, as will be discussed in more detail below, the sides 105A-105D need not be symmetrical or have identical lengths. Each of the sides 105A-105D may have different lengths or some of the sides 105A-105D may have similar lengths while others of the sides 105A-105D may have different lengths.

The waveguide 100 is referred to as an irregular hexagon waveguide because the fifth side 110A and the sixth side 110B each have a length that is different from the sides 105A-105D. As shown in FIG. 1, the fifth side 110A and the sixth side 110B have a same length that is longer than a length of sides 105A-105D. Although, it is conceivable, that fifth side 110A and sixth side 110B may have a length that is the same as or shorter than a length of sides 105A-105D. It should be noted that in the special case where fifth side 110A and sixth side 110B have a length that is the same as a length of sides 105A-105D, the waveguide 100 may be a regular hexagonal waveguide. The term "hexagonal" as used herein, may include both irregular or regular hexagonal waveguides while the term "irregular hexagon" or "regular hexagon" excludes a regular hexagon or irregular hexagon, respectively.

The waveguide 100 has many advantages over conventional the waveguides. First, the waveguide 100 may provide suitable electrical characteristics for receiving a signal of comparable frequency, power, transmission loss, and other electrical characteristics as, for example, conventional rectangular waveguides. However, the waveguide 100 may be more easily created using metal additive manufacturing processes (e.g., 3D metal printing) than, for example, conventional rectangular waveguides.

Metal additive manufacturing is a fabrication method that allows for complex integrated structures to be fabricated as a single part. However, one unique aspect of metal additive manufacturing is that these complex integrated structures are fabricated as layers laid on top of other layers of metal. Thus, orientation, or printing order, of specific parts or pieces must be considered to ensure that a hollow metal waveguide, or other structure, may be formed within an integrated structure without additional build support within the waveguide. In other words, during metal additive manufacturing, only a first layer of metal may be printed without having another layer underneath the first layer preferably in a positive Z-direction (e.g., from approximately 0° to approximately 90° to the X-Y plane). This is possible by printing onto a metal build plate to support the build of a structure in, preferably, a positive Z-direction in a typical metal additive manufacturing build process. Further, another constraint of metal additive manufacturing is that a metal layer must be printed on another layer of metal (or build substrate in the case of the first metal layer). In one example, a rectangular waveguide may have four sides, a bottom, two vertical sides, and a top. Printing a rectangular waveguide, however, presents difficulties because, while the bottom and vertical sides may be easily printed, the top side of the rectangular waveguide must be printed without a layer of material underneath it. Thus, any new layer has no metal layer on which to print a top side of the rectangular waveguide. To print a top surface, at least some overhang from a previous layer must extend, at least on a micron level, across a gap between the vertical sides of the rectangular waveguide in order to eventually join the vertical sides with a top side. While some overhang can be tolerated, an overhang of 0°, or a right-angle, as in a rectangular waveguide, typically leads to mechanical defects or requires internal support structures to fabricate.

Overhang generated during the layering of an additive manufacturing fabrication at transitions with angles at or near 0° can produce significant mechanical defects. Such overhang tends to occur at locations where one or more sides of the component being manufactured encounters a significant transition (e.g., an angle approaching 0°) in the build direction. Therefore, it is desirable to maintain the angles between different surfaces within a prescribed range of 45°+/−25° through selective component shaping and build orientation during manufacturing. The waveguide 100 provides a waveguide with angles that have more moderate transition angles between each one of sides 105A-105D and with fifth side 110A and sixth side 110B. It is noted that third side 105C and fourth side 105D may be supported by metal and only first side 105A and second side 105B are considered to be overhanging sides, as will be discussed below.

The waveguide 100, and other waveguides disclosed herein, may include short wall edges that may be chamfered with a 45°±25° angle applied to what would originally have been a sharp point, as will be shown and discussed below. This edge chamfering allows for a build orientation of a waveguide structure optimally suited for fabrication with metal additive manufacturing by minimizing overhangs and maintaining an optimum angle for surface roughness.

In some embodiments, print orientation of the various embodiments of the waveguides disclosed herein is generally along the positive z-axis direction, which is a presently preferred orientation for the waveguides, and which also tends to minimize overhang. As such, an irregular hexagonal-shaped cross-section of the waveguide 100 is a useful geometry for both the electrical characteristics required for a waveguide, but also for printing by additive manufacturing techniques. The waveguide 100 minimizes build volume of more complex waveguide assemblies while also reducing overhang issues by keeping critical overhang angles controlled to 45°±25° For example, short walls are chamfered on each corner by a nominal 45° angle such that the waveguide 100 comes to a point between any of sides 105A-105D and sides 110A-110B. As will be discussed below, other embodiments, such as single-ridged and dual-ridged waveguide embodiments, discussed below, allow for broader bandwidth structures that have optimal geometry for metal additive manufacturing fabrication methods. Symmetry of the waveguide 100 (chamfers on upper and lower edge) may be employed for improved RF performance and routing. In some embodiments, the waveguide 100 may the bent/tilt slightly along the axis of extrusion to allow for better fabrication, as will be discussed below.

Figure 2:
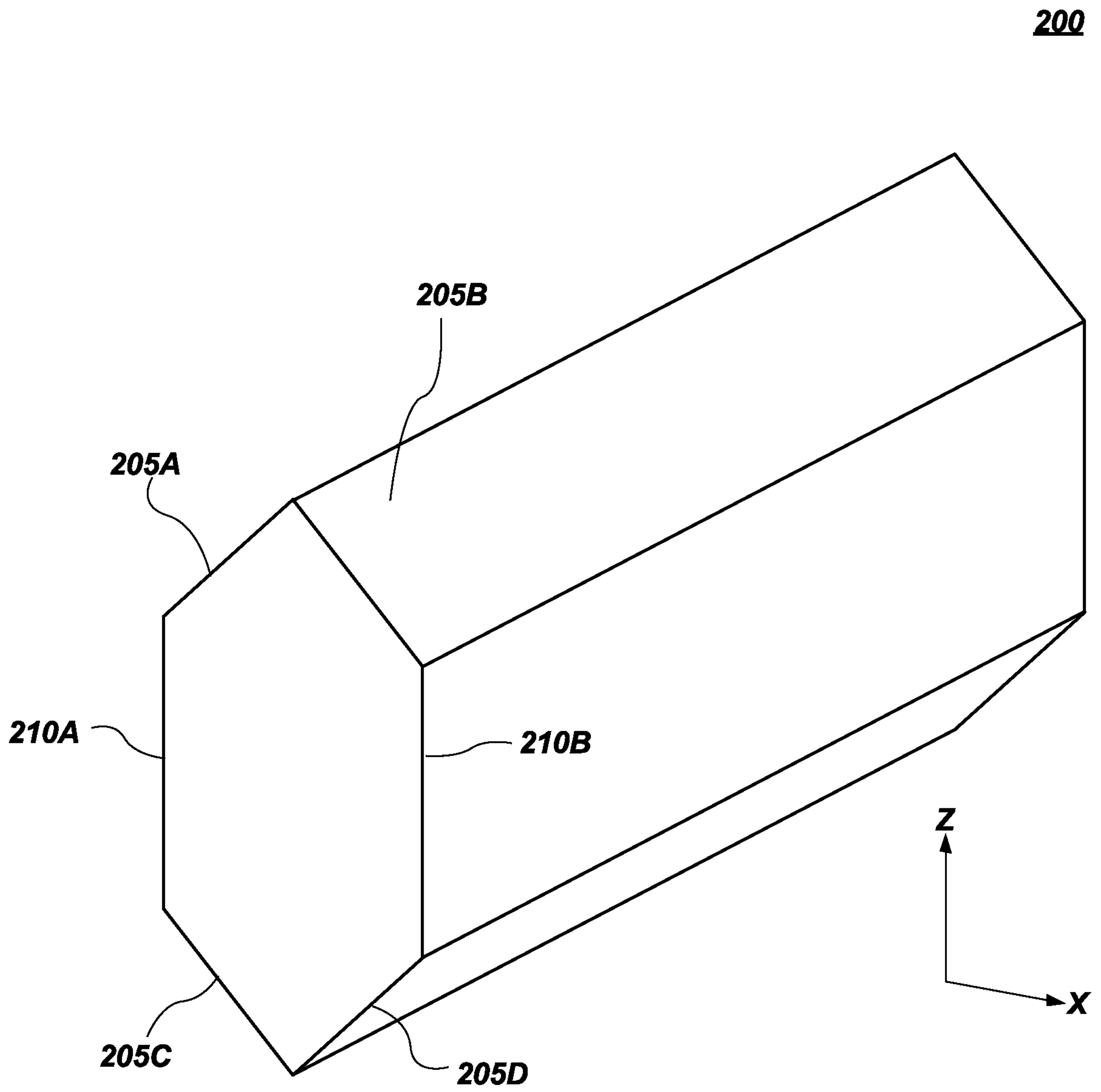
FIG. 2 illustrates a perspective view of an air volume of an irregular hexagonal waveguide.

FIG. 2 illustrates a perspective view of an air volume of an irregular hexagonal waveguide 200. The waveguide 200 may include a cross section of the waveguide 100, shown in FIG. 1 and discussed above, although the waveguide 200 has been extruded in the Y plane to demonstrate a depth of the waveguide 200. As shown in FIG. 2, the waveguide 200 includes a first side 205A and a second side 205B which are symmetrical with identical lengths. The waveguide 200 further includes a third side 205C and a fourth side 205D which are also symmetrical with identical lengths. As shown in FIG. 2, each of sides 205A-205D are symmetrical with identical lengths. However, as will be discussed in more detail below, sides 205A-205D need not be symmetrical or have identical lengths. Each of sides 205A-205D may have different lengths or some of sides 205A-205D may have similar lengths while others of sides 205A-205D may have different lengths.

The waveguide 200 is referred to as an irregular hexagon because fifth side 210A and sixth side 210B have a length that is different from sides 205A-205D. As shown in FIG. 2, fifth side 210A and sixth side 210B have a same length that is longer than a length of sides 205A-205D. Although, it is conceivable, that fifth side 210A and sixth side 210B may have a length that is the same as or shorter than a length of sides 205A-205D. It should be noted that in the special case where fifth side 210A and sixth side 210B have a length that is the same as a length of sides 205A-205D, the waveguide 200 may be a regular hexagonal waveguide.

Figure 3:
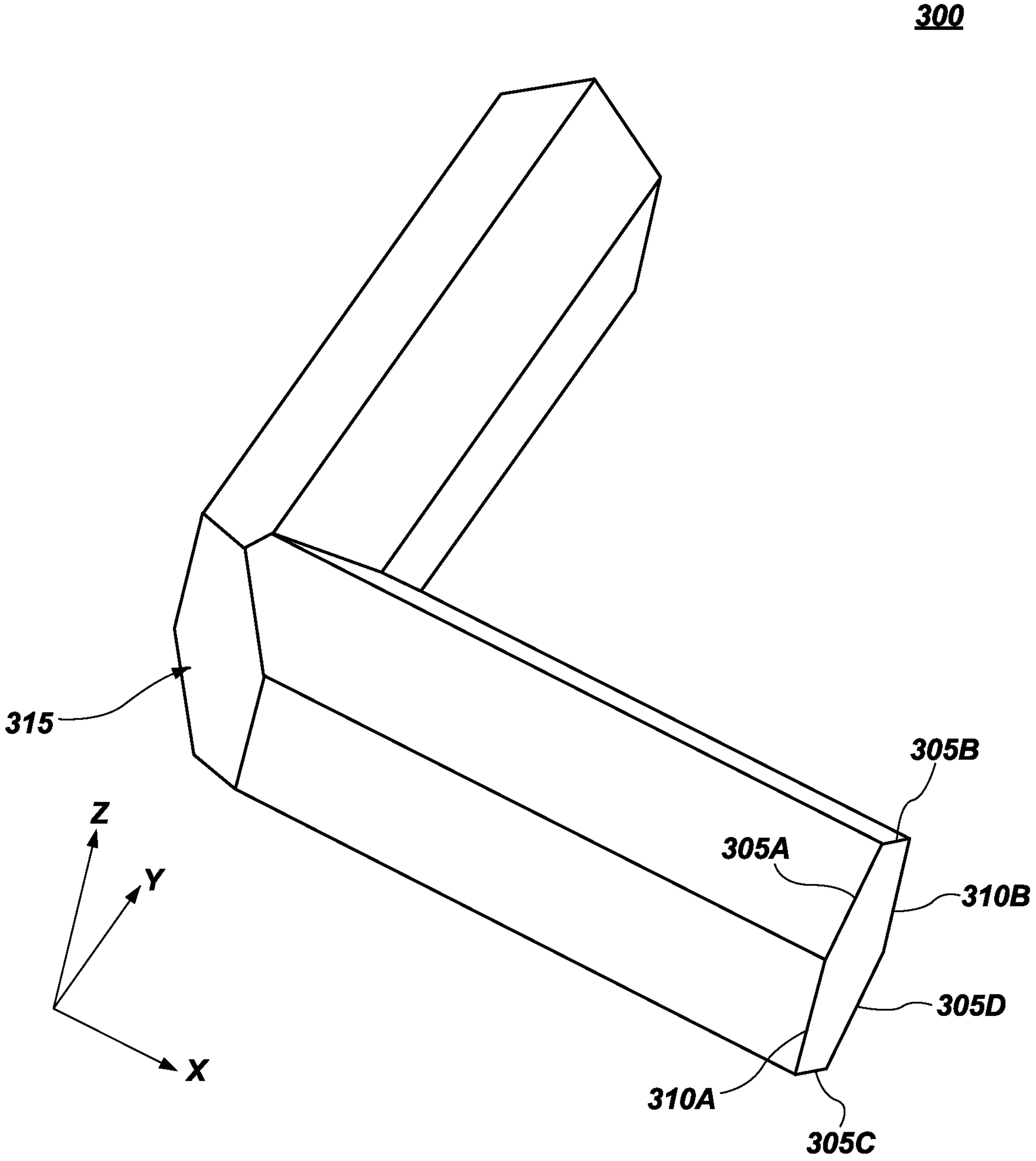
FIG. 3 illustrates a perspective view of an embodiment of an air volume of an irregular hexagonal waveguide with a 90° sharp E-plane the bend.

FIG. 3 illustrates a perspective view of an embodiment of an air volume for a waveguide 300, wherein the waveguide 300 comprises an irregular hexagonal waveguide geometry and a 90° sharp E-plane bend. The waveguide 300 includes a plurality of sides. For example, the waveguide 300 includes a first side 305A and a second side 305B which are symmetrical with identical lengths. The waveguide 300 further includes a third side 305C and a fourth side 305D which are also symmetrical with identical lengths. As shown in FIG. 3, each of sides 305A-305D are symmetrical with identical lengths. However, as will be discussed in more detail below, sides 305A-305D need not be symmetrical or have identical lengths. Each of sides 305A-305D may have different lengths or some of sides 305A-305D may have similar lengths while others of sides 305A-305D may have different lengths.

The waveguide 300 is referred to as an irregular hexagon because fifth side 310A and sixth side 310B have a length that is different from sides 305A-305D. As shown in FIG. 3, fifth side 310A and sixth side 310B have a same length that is longer than a length of sides 305A-305D. Although, it is conceivable, that fifth side 310A and sixth side 310B may have a length that is the same as or shorter than a length of sides 305A-305D. It should be noted that in the special case where fifth side 310A and sixth side 310B have a length that is the same as a length of sides 305A-305D, the waveguide 300 may be a regular hexagonal waveguide.

As shown in FIG. 3, the waveguide 300 provides a 90° sharp E-plane bend which refers to a direction of propagation for an electromagnetic wave (perpendicular to the H-plane, for example). The waveguide 300 includes an irregular or regular hexagonal chamfer 315 depending on the relative lengths of sides 305A-305D and 310A-310B. The chamfer 315 provides a surface that allows a wave propagating through the bend to change direction by 90° by providing the appropriate impedance transition for the waveguide mode with the chamfer 315.

Figure 4:
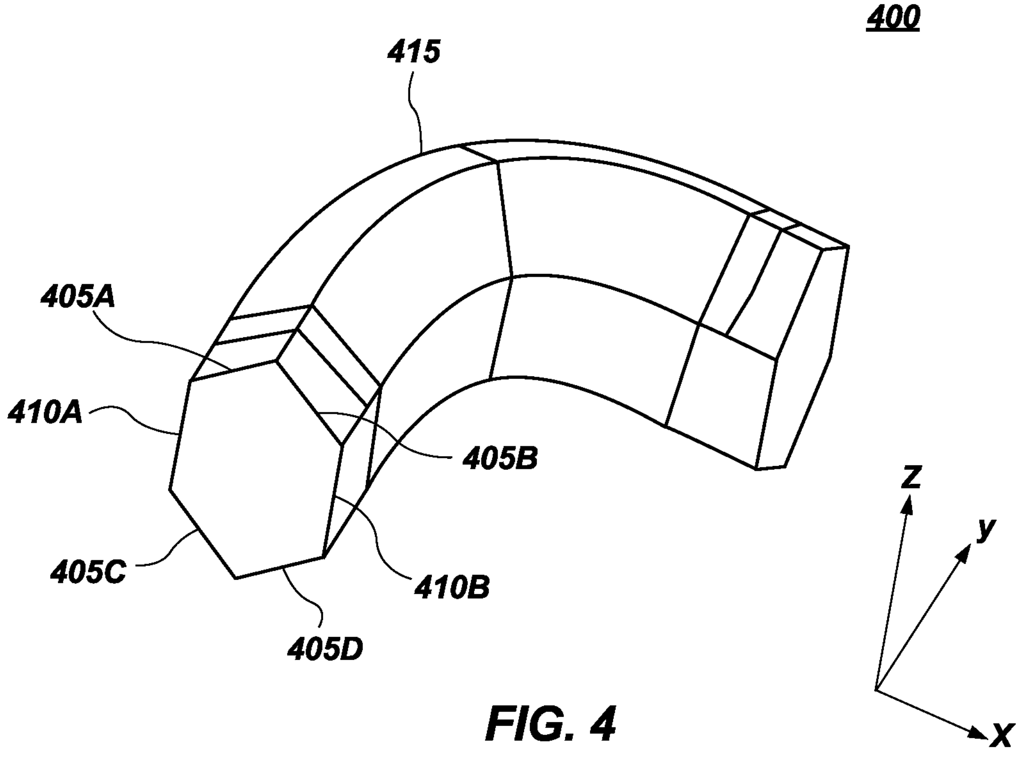
FIG. 4 illustrates a perspective view of an embodiment of an air volume of an irregular hexagonal waveguide with a 90° smooth E-plane the bend.

FIG. 4 illustrates a perspective view of an embodiment of an air volume of a waveguide 400 comprising an irregular hexagonal waveguide and a 90° smooth E-plane bend. The waveguide 400 includes a plurality of sides. For example, the waveguide 400 includes a first side 405A and a second side 405B which are symmetrical with identical lengths. The waveguide 400 further includes a third side 405C and a fourth side 405D which are also symmetrical with identical lengths. As shown in FIG. 4, each of sides 405A-405D are symmetrical with identical lengths. However, as will be discussed in more detail below, sides 405A-405D need not be symmetrical or have identical lengths. Each of the sides 405A-405D may have different lengths or some of the sides 405A-405D may have similar lengths while others of sides 405A-405D may have different lengths.

The waveguide 400 is referred to as an irregular hexagon because the fifth side 410A and sixth side 410B have a length that is different from the sides 405A-405D. As shown in FIG. 4, fifth side 410A and sixth side 410B have a same length that is longer than a length of sides 405A-405D. Although, it is conceivable, that fifth side 410A and sixth side 410B may have a length that is the same as or shorter than a length of sides 405A-405D. It should be noted that in the special case where fifth side 410A and sixth side 410B have a length that is the same as a length of sides 405A-405D, the bend 400 may be a regular hexagonal waveguide.

As shown in FIG. 4, the waveguide 400 provides a 90° smooth E-plane the bend which refers to a direction of propagation for an electromagnetic wave (perpendicular to the H-plane, for example). The waveguide 400 may be implemented with a successively angled transition 415 which changes a direction of an electromagnetic wave by 90°. The waveguide 400 provides the same function as a chamfer 315, shown in FIG. 3, by simply extending sides 405A-405D and 410A-410B around successively angled transition 415. However, the waveguide 400 may be more useful in some circumstances than the bend 300, shown in FIG. 3.

Figure 5:
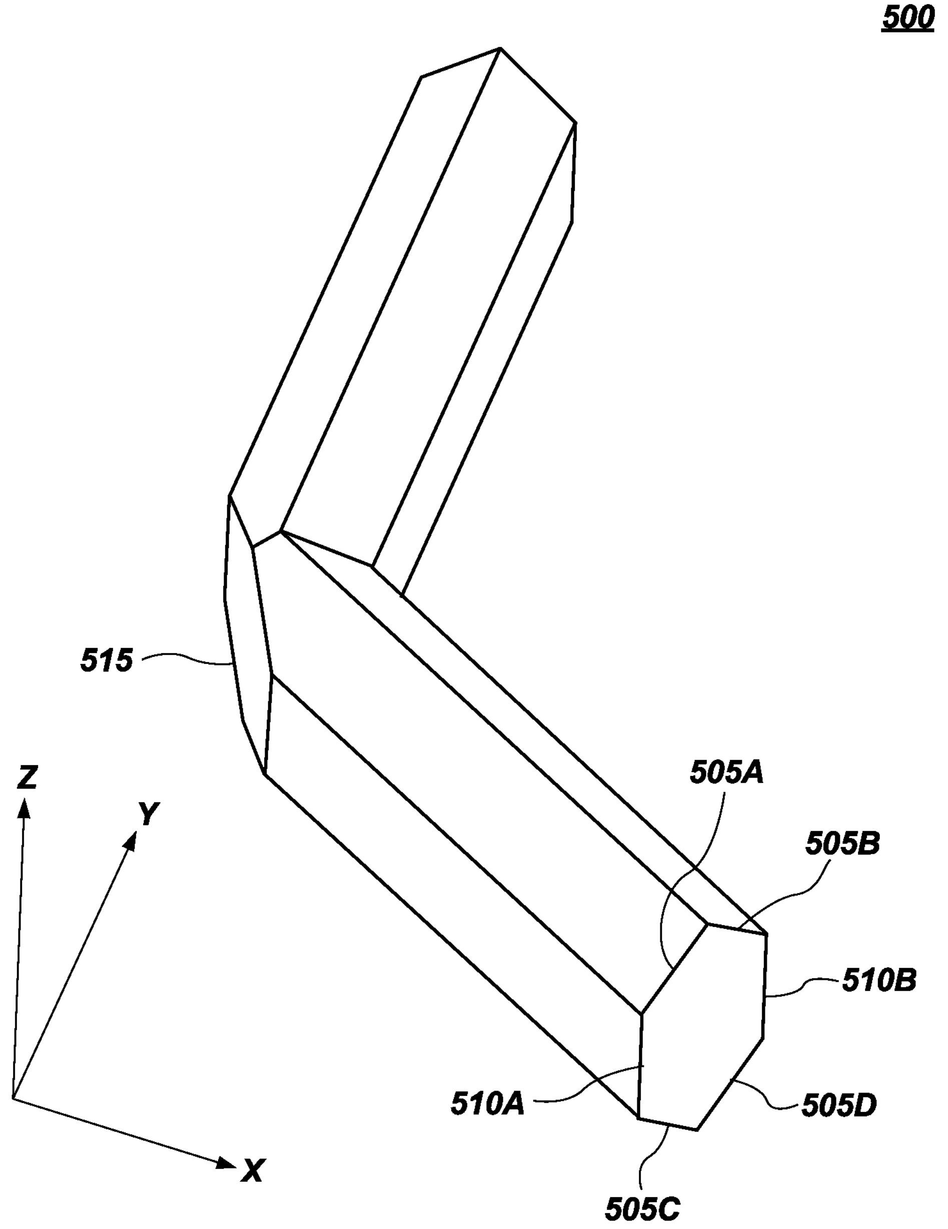
FIG. 5 illustrates a perspective view of an embodiment of an air volume of an irregular hexagonal waveguide with an obtuse angle sharp E-plane the bend.

FIG. 5 illustrates a perspective view of an embodiment of an air volume of an irregular hexagonal waveguide 500 with an obtuse angle sharp E-plane bend. The waveguide 500 includes a plurality of sides. For example, the waveguide 500 includes a first side 505A and a second side 505B which are symmetrical with identical lengths. The waveguide 500 further includes a third side 505C and a fourth side 505D which are also symmetrical with identical lengths. As shown in FIG. 5, each of sides 505A-505D are symmetrical with identical lengths. However, as will be discussed in more detail below, sides 505A-505D need not be symmetrical or have identical lengths. Each of sides 505A-505D may have different lengths or some of sides 505A-505D may have similar lengths while others of sides 505A-505D may have different lengths.

The waveguide 500 is referred to as an irregular hexagon because fifth side 510A and sixth side 510B have a length that is different from sides 505A-505D. As shown in FIG. 5, fifth side 510A and sixth side 510B have a same length that is longer than a length of sides 505A-505D. Although, it is conceivable, that fifth side 510A and sixth side 510B may have a length that is the same as or shorter than a length of sides 505A-505D. It should be noted that in the special case where fifth side 510A and sixth side 510B have a length that is the same as a length of sides 505A-505D, the waveguide 500 may be a regular hexagonal waveguide.

As shown in FIG. 5, the waveguide 500 provides an obtuse angle E-plane bend. In other words, the waveguide 500 has an angle of greater than 90°. The waveguide 500 includes an irregularly or regularly hexagonal chamfer 515 depending on the relative lengths of sides 505A-505D and 510A-510B. The chamfer 515 provides a surface that allows a wave propagating through the waveguide 500 to change direction by an obtuse angle by providing the appropriate impedance transition for the waveguide mode with chamfer 515. As shown in FIG. 5, the waveguide 500 may be set at a tilted inclination along a length of the waveguide 500. That is, a particular cross section of the waveguide 500 may be slightly offset from a previous or subsequent cross section along the length of the waveguide 500 to facilitate fabrication requirements.

Figure 6:
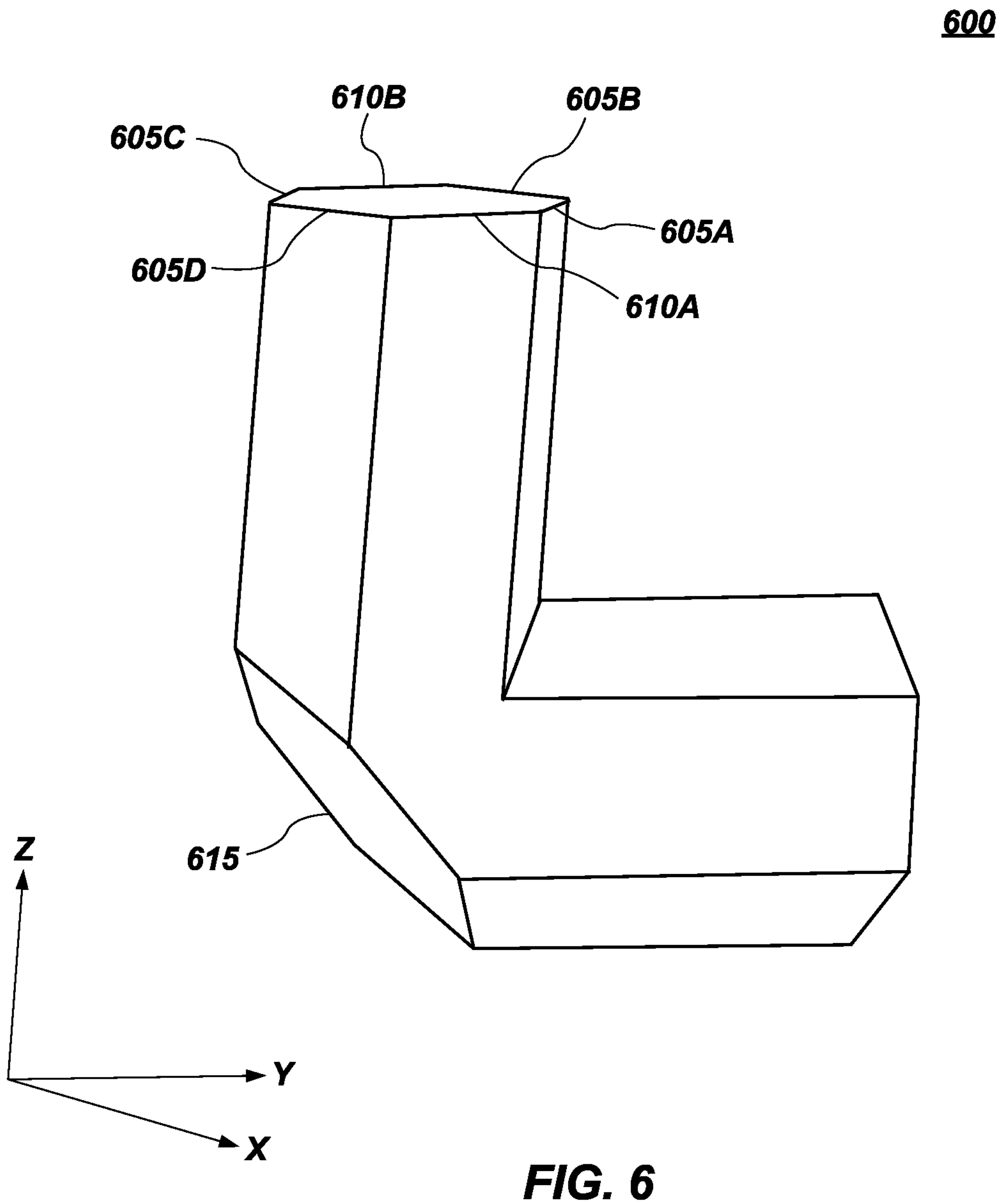
FIG. 6 illustrates a perspective view of an embodiment of an air volume of an irregular hexagonal waveguide with a 90° H-plane the bend.

FIG. 6 illustrates a perspective view of an embodiment of an air volume of an irregular hexagonal waveguide 600 comprising a 90° H-plane bend. The waveguide 600 includes a plurality of sides. For example, the waveguide 600 includes a first side 605A and a second side 605B which are symmetrical with identical lengths. The waveguide 600 further includes a third side 605C and a fourth side 605D which are also symmetrical with identical lengths. As shown in FIG. 6, each of the sides 605A-605D are symmetrical with identical lengths. However, as will be discussed in more detail below, sides 605A-605D need not be symmetrical or have identical lengths. Each of sides 605A-605D may have different lengths or some of sides 605A-605D may have similar lengths while others of sides 605A-605D may have different lengths.

The waveguide 600 is referred to as an irregular hexagon because fifth side 610A and sixth side 610B have a length that is different from sides 605A-605D. As shown in FIG. 6, fifth side 610A and sixth side 610B have a same length that is longer than a length of sides 605A-605D. Although, it is conceivable, that fifth side 610A and sixth side 610B may have a length that is the same as or shorter than a length of sides 605A-605D. It should be noted that in the special case where fifth side 610A and sixth side 610B have a length that is the same as a length of sides 605A-605D, the waveguide 600 may be a regular hexagonal waveguide.

As shown in FIG. 6, the waveguide 600*t* provides a 90° H-plane bend. The waveguide 600 includes a chamfer 615 which provides a surface that allows a wave propagating through the bend 600 to change direction by 90° by providing the appropriate impedance transition for the waveguide mode with chamfer 615. As shown in FIG. 6, the waveguide 600 may be set at a tilted inclination along a length of the waveguide 600. That is, a particular cross section of the waveguide 600 may be slightly offset from a previous or subsequent cross section along the length of the waveguide 600 to facilitate fabrication requirements.

Figure 7:
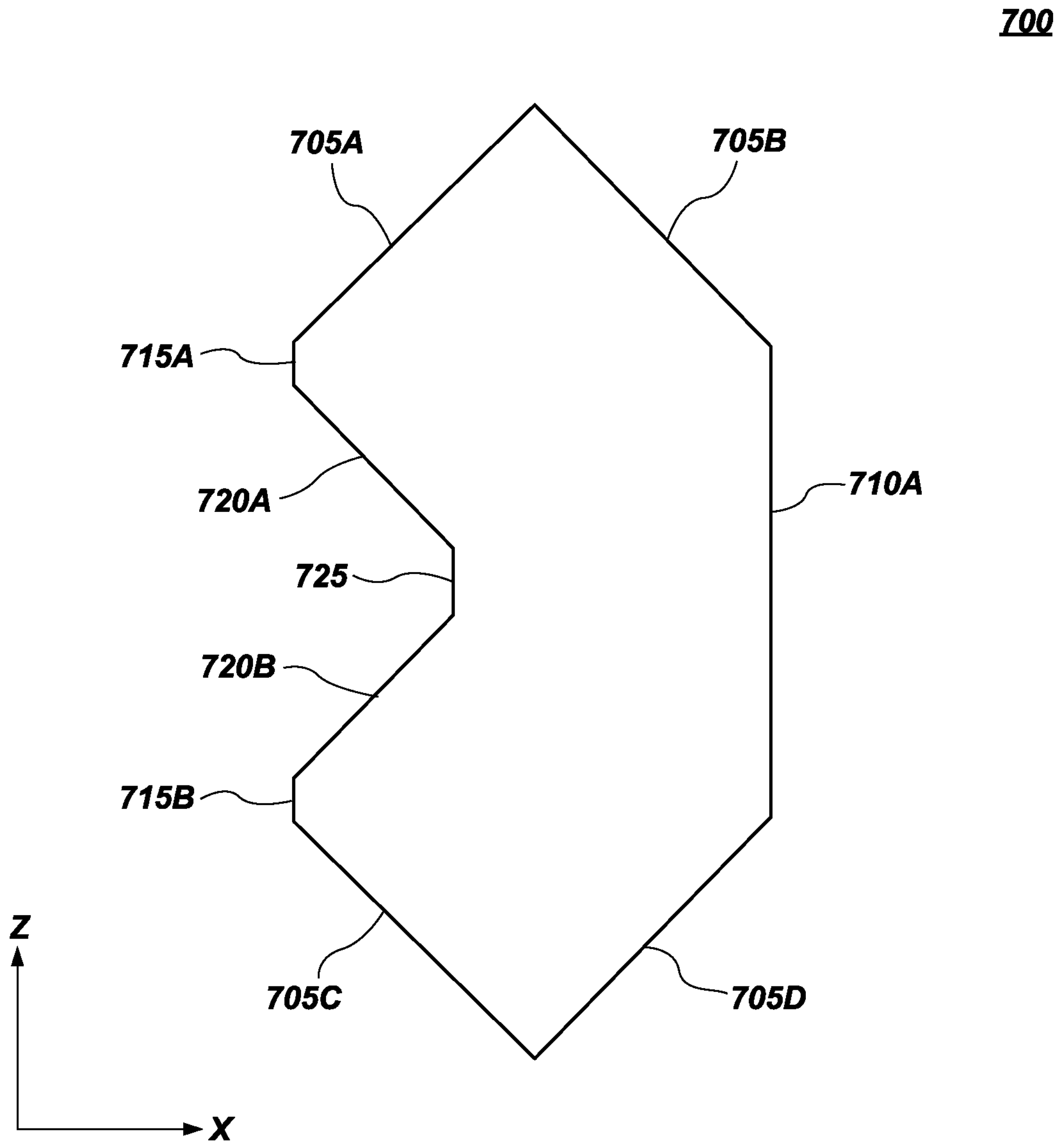
FIG. 7 illustrates an embodiment of a cross section of an irregular hexagonal waveguide having a complex irregular side.

FIG. 7 illustrates an embodiment of a cross section of an irregular hexagonal waveguide 700 comprising a complex irregular side. The waveguide 700 includes a plurality of sides. As shown in FIG. 7, the waveguide 700 includes a first side 705A and a second side 705B which are symmetrical with identical lengths. The waveguide 700 further includes a third side 705C and a fourth side 705D which are also symmetrical with identical lengths. As shown in FIG. 7, each of sides 705A-705D are symmetrical with identical lengths. However, as will be discussed in more detail below, sides 705A-705D need not be symmetrical or have identical lengths. Each of sides 705A-705D may have different lengths or some of sides 705A-705D may have similar lengths while others of sides 705A-705D may have different lengths.

The waveguide 700 is referred to as an irregular hexagon with a complex side because a fifth side of the waveguide 700, which is a complex side, and sixth side 710A both have a length that is different from sides 705A-705D. The waveguide 700 includes a complex side identified between first side 705A and third side 705C, as shown in FIG. 7. The complex side includes two vertical sides 715A and 715B to facilitate printing orientation to accommodate a chamfer with two symmetrical sides 720A and 720B which are joined at a third vertical side 725. More simply, a side of an irregular hexagonal waveguide, such side 110A of the waveguide 100 shown in FIG. 1, is formed as being concave into the waveguide 700, as shown in FIG. 7, with three vertical sides 715A, 715B, and 725 that facilitate an angle of transition between first side 705A, vertical side 725, and third side 705C that is suitable for printing. Accordingly, the waveguide 700 may be termed a "complex single-ridged waveguide" which provides additional bandwidth capability over that provided by the waveguide 100, shown in FIG. 1. The waveguide 700 includes more than six sides as the term "hexagon" may imply. However, the complex sides of the waveguide 700 may be considered a single side with additional complex angles that facilitate a chamfer created by chamfers 720A and 720B. Accordingly, the waveguide 700 may be referred to as a hexagonal waveguide, having a plurality of sides.

Figure 8:
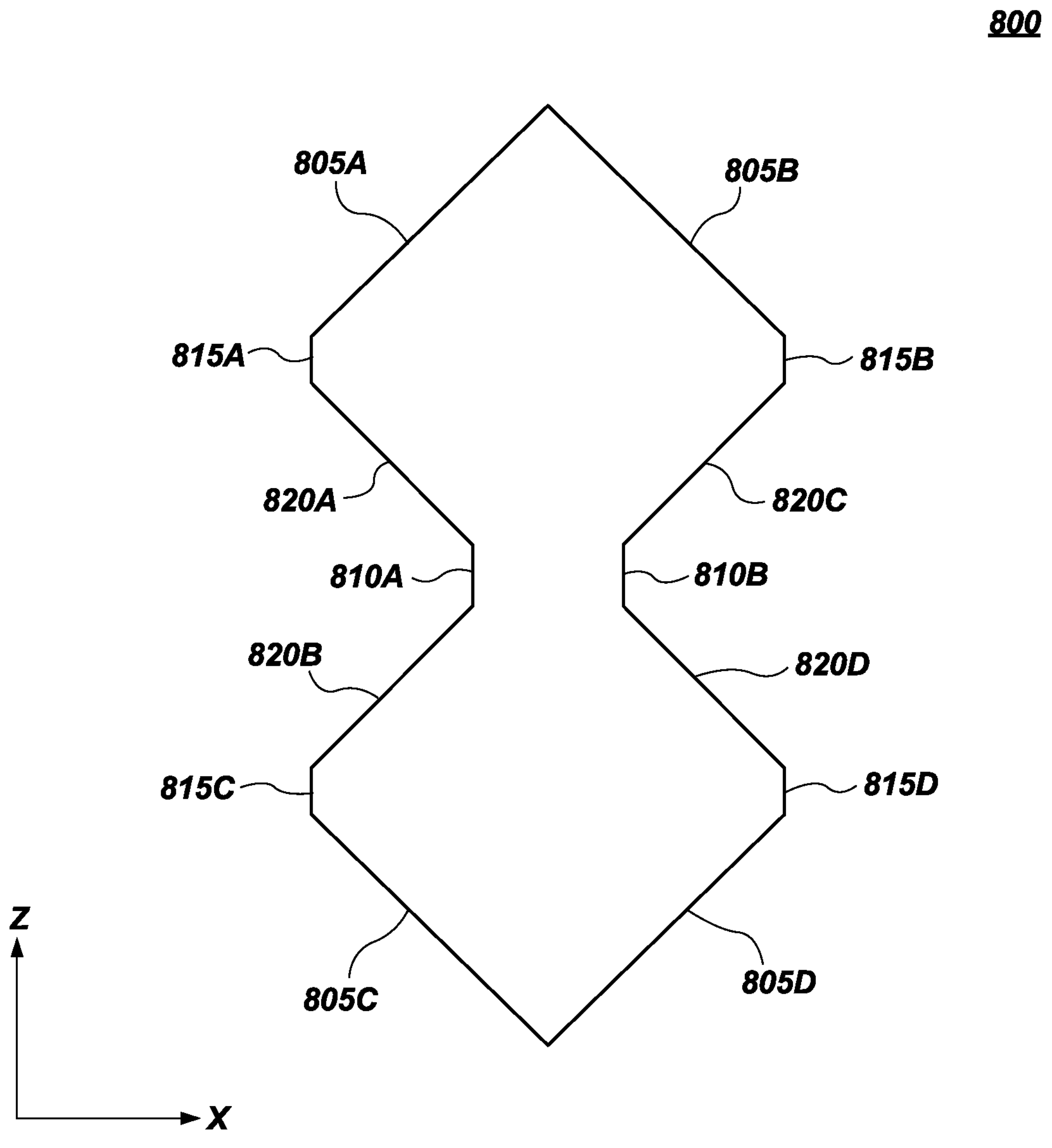
FIG. 8 illustrates an embodiment of a cross section of an irregular hexagonal waveguide having two complex irregular sides.

FIG. 8 illustrates an embodiment of a cross section of an irregular hexagonal waveguide 800 having two complex irregular sides. The waveguide 800 includes a plurality of sides. As shown in FIG. 8, the waveguide 800 includes a first side 805A and a second side 805B which are symmetrical with identical lengths. The waveguide 800 further includes a third side 805C and a fourth side 805D which are also symmetrical with identical lengths. As shown in FIG. 8, each of the sides 805A-805D are symmetrical with identical lengths. However, as will be discussed in more detail below, sides 805A-805D need not be symmetrical or have identical lengths. Each of the sides 805A-805D may have different lengths or some of sides 805A-805D may have similar lengths while others of sides 805A-805D may have different lengths.

The waveguide 800 includes two complex sides, as described below. For example, the waveguide 800 includes a first side 805A, a second side 805B, a third side 805C, and a fourth side 805D. Complex sides may be identified between first side 805A and third side 805C and second side 805B and fourth side 805D, respectively, as shown in FIG. 8. A first complex side of the waveguide 800 includes two vertical sides 815A and 815C to facilitate printing orientation and includes a chamfer implemented by two symmetrical sides 820A and 820B which are joined at a third vertical side 810A. A second complex side of the waveguide 800 includes two vertical sides 815B and 815D to facilitate printing orientation, as described above, and includes a second chamfer implemented by two symmetrical sides 820C and 820D which are joined at a third vertical side 810B. More simply, two sides of an irregular hexagonal waveguide, such sides 110A and 110B of the waveguide 100 shown in FIG. 1, are formed as being concave into the waveguide 800, as shown in FIG. 8, with three vertical sides per complex side 815A, 815C, and 810A on one complex side and vertical side 815B, 815D, and 810B that facilitate an angle of transition in each complex side of the waveguide 800. Accordingly, the waveguide 800 may be termed a "complex double-ridged the waveguide" which provides additional bandwidth capability over that provided by the waveguide 100, shown in FIG. 1. The waveguide 800 includes more than six sides as the term "hexagon" may imply. However, the complex sides of the waveguide 800 may be considered a single side with additional complex angles that facilitate a chamfer created by chamfers 820A and 820B and 820C and 820D. Accordingly, the waveguide 800 may be referred to as a hexagonal waveguide, having a plurality of sides.

Figure 9:
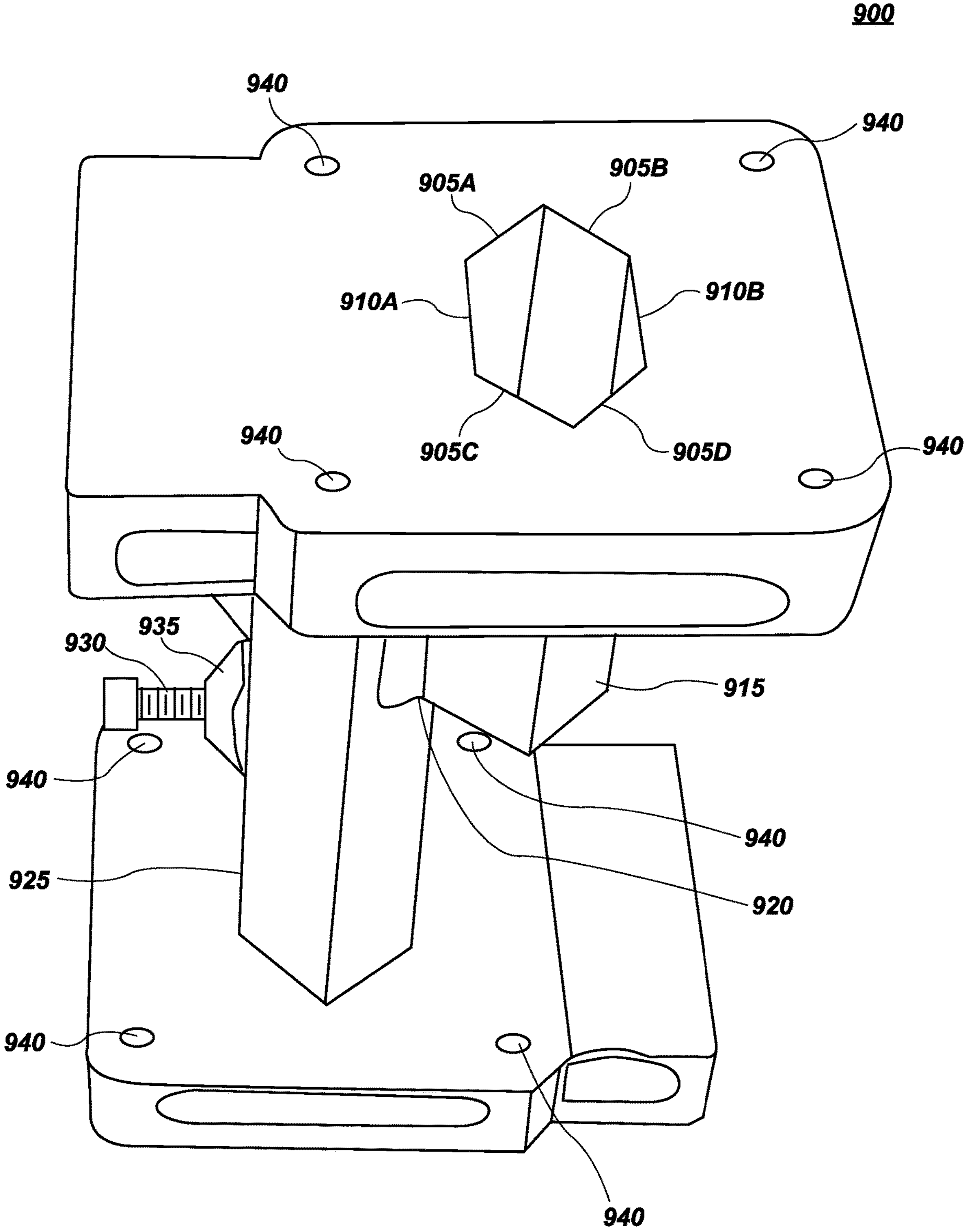
FIG. 9 illustrates an embodiment of a fabricated the waveguide component illustrating the irregular hexagonal waveguide.

FIG. 9 illustrates an embodiment of a fabricated waveguide component 900 illustrating the irregular hexagonal waveguide. The waveguide component 900 may be an exemplary physical manifestation of a waveguide, such as the waveguide 100, shown in FIG. 1. Accordingly, the waveguide component 900 includes a waveguide having a plurality of sides. The waveguide 915 includes a first side 905A and a second side 905B which are symmetrical with identical lengths. The waveguide 915 further includes a third side 905C and a fourth side 905D which are also symmetrical with identical lengths. As shown in FIG. 9, each of sides 905A-905D are symmetrical with identical lengths. However, as will be discussed in more detail below, sides 905A-905D need not be symmetrical or have identical lengths. Each of sides 905A-905D may have different lengths or some of sides 905A-905D may have similar lengths while others of sides 905A-905D may have different lengths.

The waveguide 915 is referred to as an irregular hexagon because fifth side 910A and sixth side 910B have a length that is different from sides 905A-905D. As shown in FIG. 9, fifth side 910A and sixth side 910B have a same length that is longer than a length of sides 905A-905D. Although, it is conceivable, that fifth side 910A and sixth side 910B may have a length that is the same as or shorter than a length of sides 905A-905D.

As shown in FIG. 9, the waveguide 915 may be connected to the waveguide 925 at junction 920 to alter the electrical characteristics of the waveguide 915. For example, the waveguide 925 may provide additional bandwidth over what the waveguide 915 may support or, alternatively, the waveguide 915 and the waveguide 925 may act together as at least a portion of an RF power splitter in other embodiments, or as an RF filter in other embodiments. The waveguide 915 and the waveguide 925 may be provided with a tuning screw 930 which may serve to tune at least some characteristics of the waveguides 915 and 925 through tuning port 935.

The waveguide component 900 may be integrally fashioned as a constituent element of, for example, an integrated antenna array. However, as shown in FIG. 9, the waveguide component 900 is fitted with a plurality of mounting holes 940 which allow the waveguide component 900 to be fixedly attached to another RF element, for example. In such an example, a radiating element may receive an electromagnetic signal which is propagated by a waveguide bolted into the waveguide 915 by mounting holes 940 where a frequency filter is applied at junction 920 between the waveguide 915 and 925. The waveguide 925 may output the filtered electromagnetic signal to a bolted-on receiver via mounting holes 940 which may then interpret and process the electromagnetic signal. Other exemplary components may be used and attached to the waveguide component 900 via mounting holes 940. In other embodiments, the waveguide 915 and 925 may be implemented with any of the bends 300-700 shown in FIGS. 3-7, respectively to allow various components to be connected to each other in a single physical component that includes an entire chain of RF components.

Figure 10:
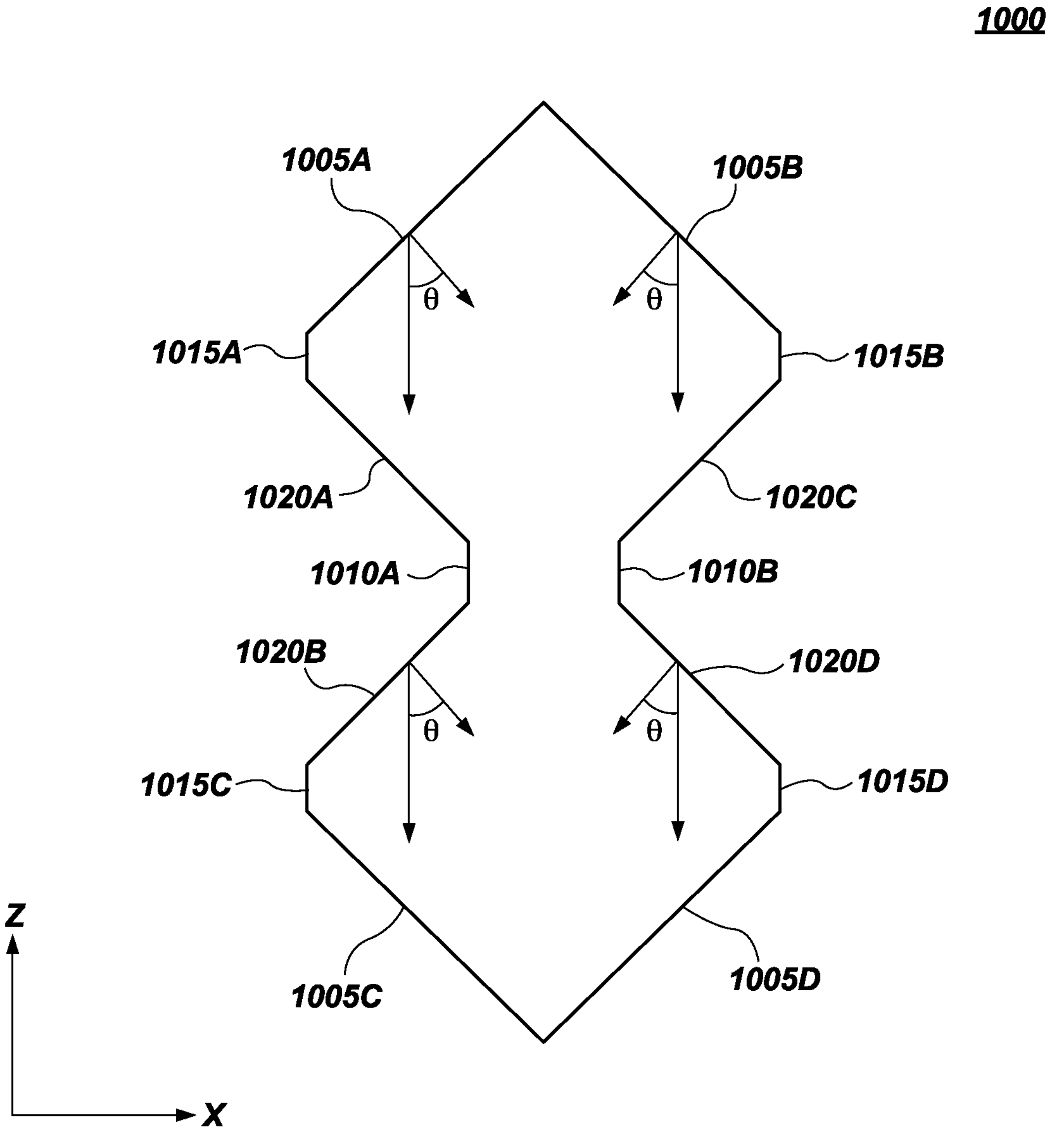
FIG. 10 illustrates a cross section of an irregular hexagonal waveguide having two complex irregular sides showing an overhang angle θ of nominally 45° between surface normal and the nadir or negative z-axis vector for all downward facing surfaces.

FIG. 10 illustrates a cross section of an irregular hexagonal waveguide 1000 having two complex irregular sides showing an overhang angle θ of nominally 45° between surface normal and the nadir or negative z-axis vector for all downward facing surfaces. The waveguide 1000 may be like the waveguide 800, shown in FIG. 8, and include a plurality of sides. As shown in FIG. 10, the waveguide 1000 includes a first side 1005A and a second side 1005B which are symmetrical with identical lengths. The waveguide 1000 further includes a third side 1005C and a fourth side 1005D which are also symmetrical with identical lengths. As shown in FIG. 10, each of sides 1005A-1005D are symmetrical with identical lengths. However, as will be discussed in more detail below, sides 1005A-1005D need not be symmetrical or have identical lengths. Each of sides 1005A-1005D may have different lengths or some of sides 1005A-1005D may have similar lengths while others of sides 1005A-1005D may have different lengths.

The waveguide 1000 includes two complex sides, as described below. For example, the waveguide 1000 includes a first side 1005A, a second side 1005B, a third side 1005C, and a fourth side 1005D. Complex sides may be identified between first side 1005A and third side 1005C and second side 1005B and fourth side 1005D, respectively, as shown in FIG. 10. A first complex side of the waveguide 1000 includes two vertical sides 1015A and 1015C to facilitate printing orientation, as described above, and includes a chamfer implemented by two symmetrical sides 1020A and 1020B which are joined at a third vertical side 1010A. A second complex side of the waveguide 1000 includes two vertical walls 1015B and 1015D to facilitate printing orientation, as described above, and includes a chamfer implemented by two symmetrical sides 1020C and 1020D which are joined at a third vertical wall 1010B. More simply, two sides of an irregular hexagonal waveguide, such as sides 110A and 110B of the waveguide 100 shown in FIG. 1, are formed as being concave into the waveguide 1000, as shown in FIG. 10, with three vertical sides per complex side 1015A, 1015C, and 1010A on one complex side and vertical sides 1015B, 1015D, and 1010B on a second complex side. Accordingly, the waveguide 1000 may be termed a "complex double-ridged the waveguide" which provides additional bandwidth capability over that provided by the waveguide 100, shown in FIG. 1. The waveguide 1000 includes more than six sides as the term "hexagon" may imply. However, the complex sides of the waveguide 1000 may be considered a single side with additional complex angles. Accordingly, the waveguide 1000 may be referred to as a hexagonal waveguide, having a plurality of sides.

FIG. 10 further illustrates an overhang angle θ of nominally 45° between surface normal and the nadir or negative z-axis vector for all downward facing surfaces, such as first side 1005A, second side 1005B, third side 1020B, and fourth side 1020D. For example, by maintaining an overhang angle θ of approximately 45°, within 25°, the waveguide 1000 may be printed with much higher fidelity in an additive manufacturing process. For example, since a waveguide made by an additive manufacturing process is effectively three dimensionally printed with one layer on top of a previous layer, each downward facing surface, such as first side 1005A, second side 1005B, third side 1020B, and fourth side 1020D must be supported by a previous printed layer. Maintaining an overhang angle θ of approximately 45°, within 25°, ensures that enough material has been deposited on a previous layer for a subsequent layer to be fully supported. In this manner, subsequent layers may overhang a previous layer until a downward facing surface is fully printed and supported by nothing more than previous layers of material. Accordingly, the waveguide 1000 provides excellent bandwidth and other electrical characteristics while also being fully printable through an additive manufacturing process.

Figure 11:
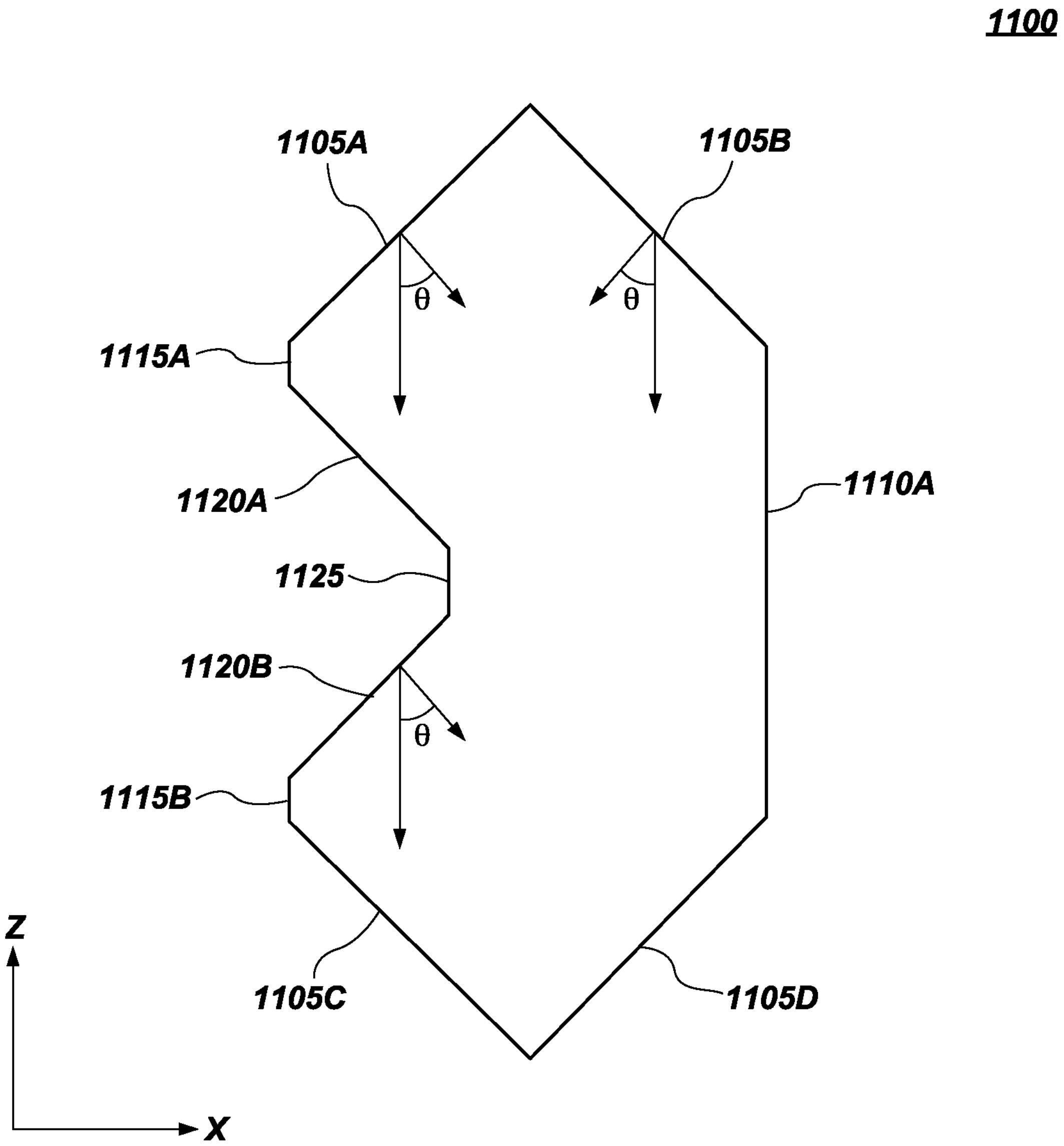
FIG. 11 illustrates an embodiment of a cross section of an irregular hexagonal waveguide having a complex irregular side showing an overhang angle θ of nominally 45° between surface normal and the nadir or negative z-axis vector for all downward facing surfaces.

FIG. 11 illustrates an embodiment of a cross section of an irregular hexagonal waveguide having a complex irregular side showing an overhang angle θ of nominally 45° between surface normal and the nadir or negative z-axis vector for all downward facing surfaces. The waveguide 1100 includes a plurality of sides. As shown in FIG. 11, the waveguide 1100 includes a first side 1105A and a second side 1105B which are symmetrical with identical lengths. The waveguide 1100 further includes a third side 1105C and a fourth side 1105D which are also symmetrical with identical lengths. As shown in FIG. 11, each of sides 1105A-1105D are symmetrical with identical lengths. However, as will be discussed in more detail below, sides 1105A-1105D need not be symmetrical or have identical lengths. Each of sides 1105A-1105D may have different lengths or some of sides 1105A-1105D may have similar lengths while others of sides 1105A-1105D may have different lengths.

The waveguide 1100 is referred to as an irregular hexagon with a complex side because a fifth side of the waveguide 1100, which is a complex side, and sixth side 1110A both have a length that is different from sides 1105A-1105D. The waveguide 1100 includes a complex side identified between first side 1105A and third side 1105C, as shown in FIG. 11. The complex side includes two vertical sides 1115A and 1115B to facilitate printing orientation, as described above, and includes a chamfer implemented by two symmetrical sides 1120A and 1120B which are joined at a third vertical 1125. More simply, a side of an irregular hexagonal waveguide, such as side 110A of the waveguide 100 shown in FIG. 1, is formed as being concave into the waveguide 1100, as shown in FIG. 11, with three vertical sides 1115A, 1115B, and 1125. Accordingly, the waveguide 1100 may be termed a "complex single-ridged waveguide" which provides additional bandwidth capability over that provided by the waveguide 100, shown in FIG. 1. The waveguide 1100 includes more than six sides as the term "hexagon" may imply. However, the complex sides of the waveguide 1100 may be considered a single side with additional complex angles. Accordingly, the waveguide 1100 may be referred to as a hexagonal waveguide, having a plurality of sides.

FIG. 11 further illustrates an overhang angle θ of nominally 45° between surface normal and the nadir or negative z-axis vector for all downward facing surfaces, such as first side 1105A, second side 1105B, and third side 1120B. For example, by maintaining an overhang angle θ of approximately 45°, within 25°, the waveguide 1100 may be printed with higher fidelity in an additive manufacturing process. For example, since a waveguide made by an additive manufacturing process is effectively three dimensionally printed with one layer on top of a previous layer, each downward facing surface, such as first side 1105A, second side 1105B, and third side 1120B must be supported by a previous printed layer. Maintaining an overhang angle θ of approximately 45°, within 25°, ensures that enough material has been deposited on a previous layer for a subsequent layer to be fully supported. In this manner, subsequent layers may overhang a previous layer until a downward facing surface is fully printed and supported by nothing more than previous layers of material. Accordingly, the waveguide 1100 provides excellent bandwidth and other electrical characteristics while also being fully printable through an additive manufacturing process.

Figure 12:
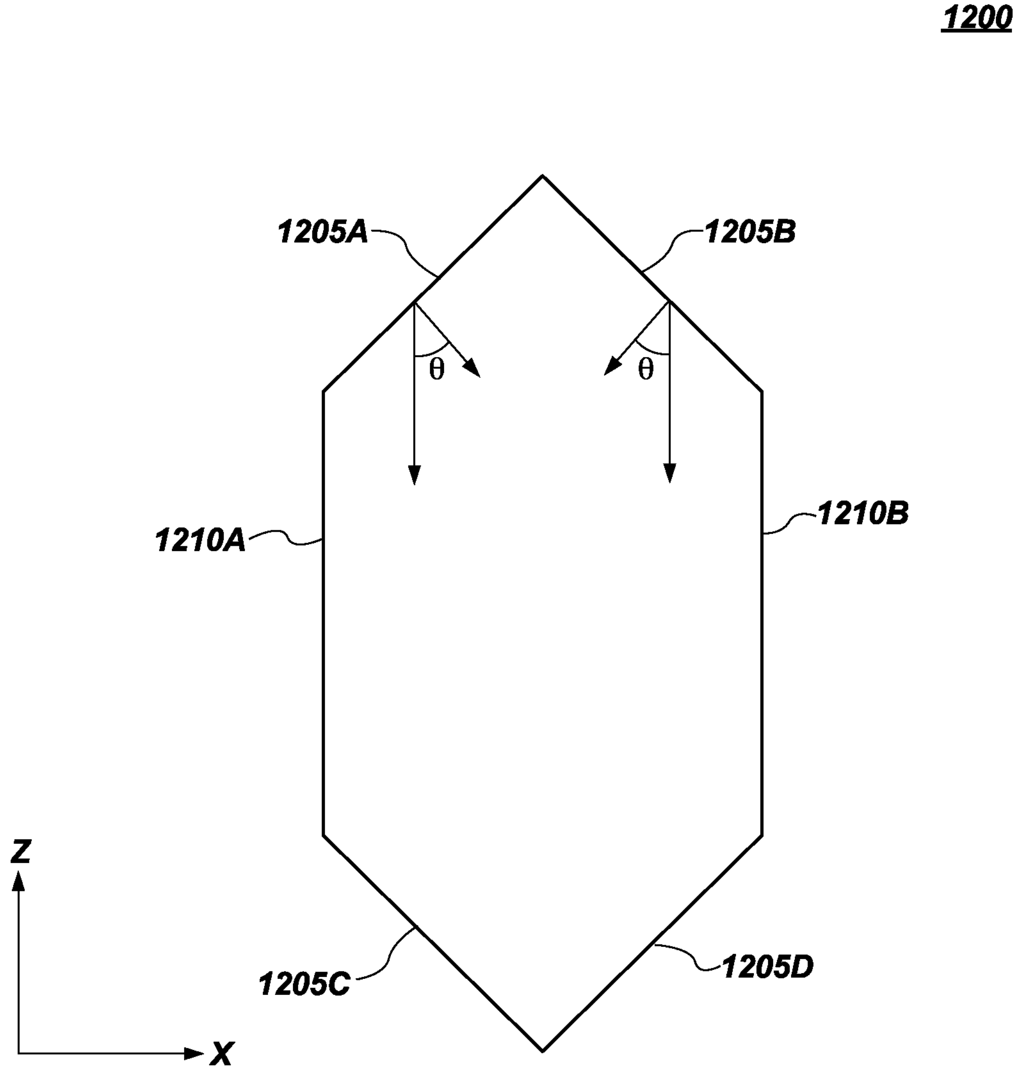
FIG. 12 illustrates an embodiment of a cross section of an irregular hexagonal waveguide showing an overhang angle θ of nominally 45° between surface normal and the nadir or negative z-axis vector for all downward facing surfaces.

FIG. 12 illustrates an embodiment of a cross section of an irregular hexagonal waveguide showing an overhang angle θ of nominally 45° between surface normal and the nadir or negative z-axis vector for all downward facing surfaces. The waveguide 1200 includes a plurality of sides. As shown in FIG. 12, the waveguide 1200 includes a first side 1205A and a second side 1205B which are symmetrical with identical lengths. The waveguide 1200 further includes a third side 1205C and a fourth side 1205D which are also symmetrical with identical lengths. As shown in FIG. 12, each of sides 1205A-1205D are symmetrical with identical lengths. However, as will be discussed in more detail below, sides 1205A-1205D need not be symmetrical or have identical lengths. Each of sides 1205A-1205D may have different lengths or some of sides 1205A-1205D may have similar lengths while others of sides 1205A-1205D may have different lengths.

The waveguide 1200 is referred to as an irregular hexagon because fifth side 1210A and sixth side 1210B have a length that is different from sides 1205A-1205D. As shown in FIG. 12, fifth side 1210A and sixth side 1210B have a same length that is longer than a length of sides 1205A-1205D. Although, it is conceivable, that fifth side 1210A and sixth side 1210B may have a length that is the same as or shorter than a length of sides 1205A-1205D.

FIG. 12 further illustrates an overhang angle θ of nominally 45° between surface normal and the nadir or negative z-axis vector for all downward facing surfaces, such as first side 1205A and second side 1205B. For example, by maintaining an overhang angle θ of approximately 45°, within 25°, the waveguide 1200 may be printed with higher fidelity in an additive manufacturing process. For example, since a waveguide made by an additive manufacturing process is effectively three dimensionally printed with one layer on top of a previous layer, each downward facing surface, such as first side 1205A and second side 1205B must be supported by a previous printed layer. Maintaining an overhang angle θ of approximately 45°, within 25°, ensures that enough material has been deposited on a previous layer for a subsequent layer to be fully supported. In this manner, subsequent layers may overhang a previous layer until a downward facing surface is fully printed and supported by nothing more than previous layers of material. Accordingly, the waveguide 1200 provides excellent bandwidth and other electrical characteristics while also being fully printable through an additive manufacturing process.

Figure 13:
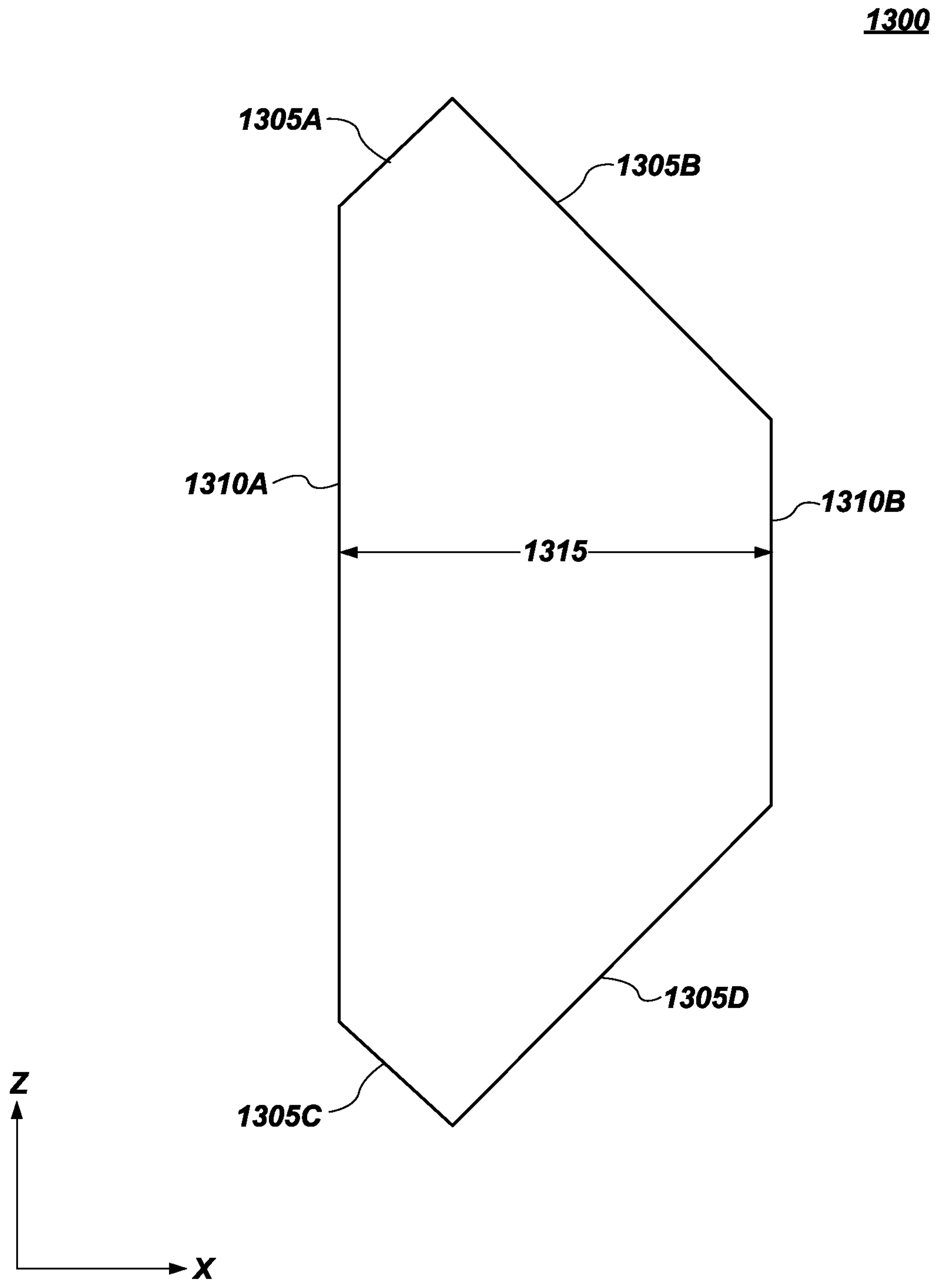
FIG. 13 illustrates an embodiment of a cross section of an irregular hexagonal waveguide.

FIG. 13 illustrates an embodiment of a cross section of an irregular hexagonal waveguide 1300. The waveguide 1300 includes a plurality of sides. As shown in FIG. 13, the waveguide 1300 includes a first side 1305A and a second side 1305B which are asymmetrical with different lengths. The waveguide 1300 further includes a third side 1305C and a fourth side 1305D which are also asymmetrical with different lengths. While it is advantageous that the waveguide 1300 be symmetrical about a horizontal centerline bisecting the waveguide 1300, it is not required in every embodiment. Each of sides 1305A-1305D may have different lengths or some of sides 1305A-1305D may have similar lengths while others of sides 1305A-1305D may have different lengths. As shown in FIG. 13, first side 1305A and third side 1305C are symmetrical about a horizontal centerline 1315 of the waveguide 1300 while second side 1305B and fourth side 1305D are symmetrical about the horizontal centerline 1315 of the waveguide 1300.

The waveguide 1300 illustrated in FIG. 13 comprises a cross-section with an irregular hexagonal geometry, wherein the irregular hexagonal geometry comprises six sides and six interior angles. Each of the six interior angles is a concave angle (i.e., an angle less than 180°). The irregular hexagonal geometry comprises at least two unique interior concave angles that are greater than 90°. The waveguide 1300 implementation illustrated in FIG. 13 does not comprise a convex interior angle (i.e., an angle that is greater than 180°). The two parallel sides 1310A and 1310B comprise different lengths.

The waveguide 1300 is referred to as an irregular hexagon because fifth side 1310A and sixth side 1310B have a length that is different from sides 1305A-1305D and from each other. As shown in FIG. 13, fifth side 1310A has a length that is longer than any of sides 1305A-1305D and 1310B. At the same time, sixth side 1310B has a length that is shorter than sides 1305B, 1305D, and 1310A but longer than first side 1305A and third side 1305C. Nonetheless, the waveguide 1300 is another exemplary embodiment of a hexagonal waveguide that is an irregular hexagon. The term "hexagonal" as used herein, may include both irregular or regular hexagonal waveguides while the term "irregular hexagon" or "regular hexagon" excludes a regular hexagon or irregular hexagon, respectively.

Figure 14A:
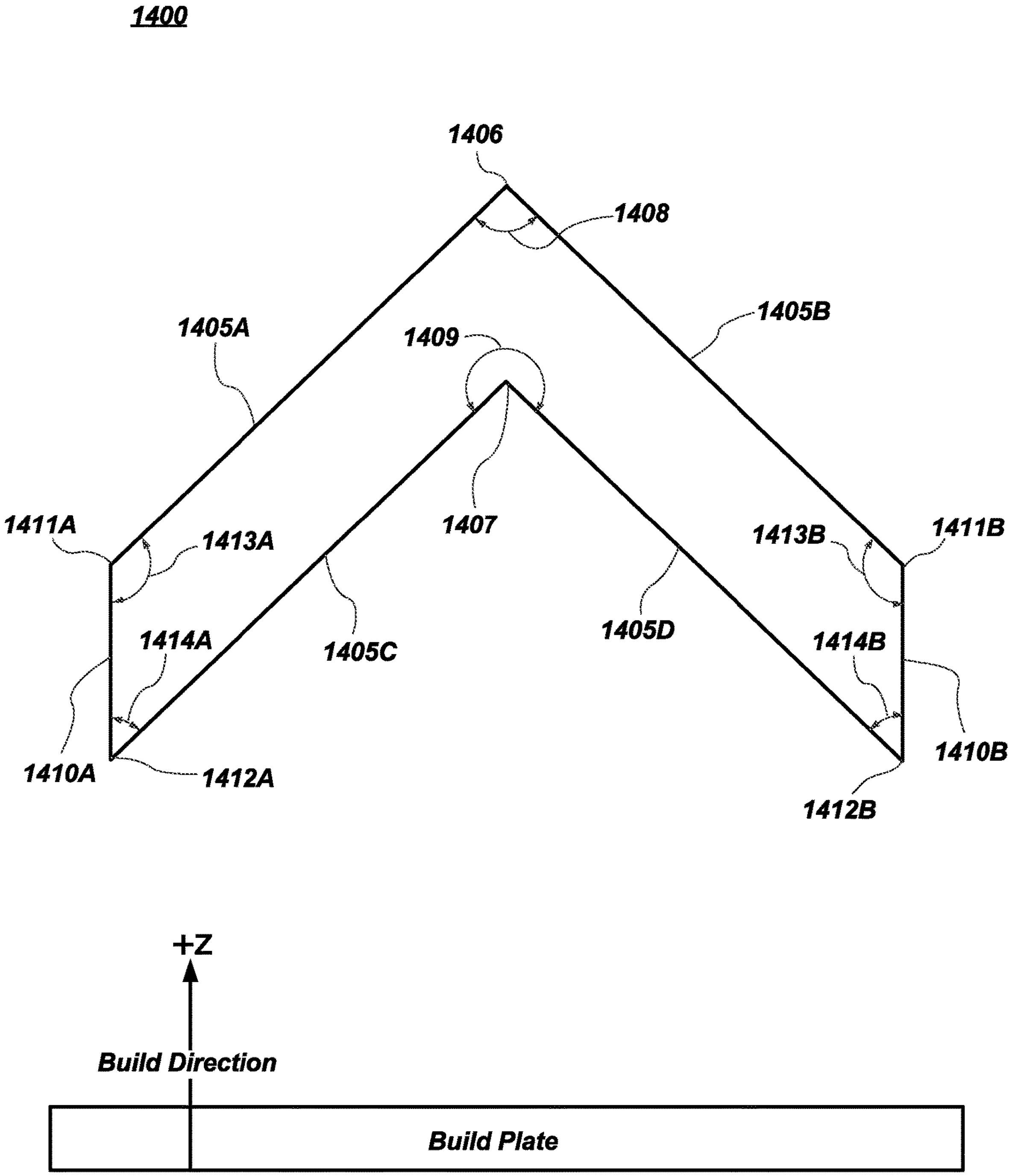
FIG. 14A illustrates a cross-sectional side view of a cross section of a waveguide comprising an irregular hexagonal geometry.
Figure 14B:
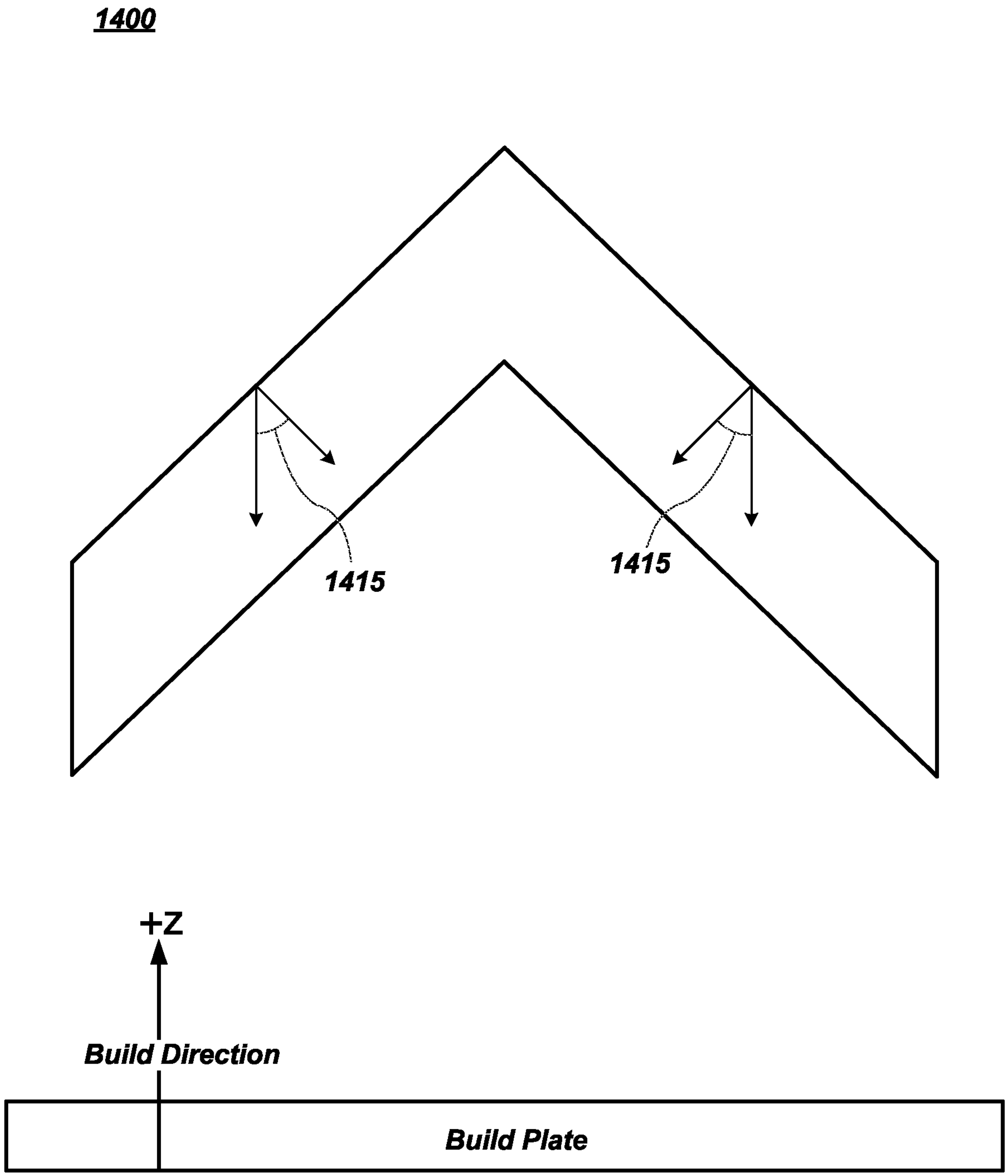
FIG. 14B illustrates a cross-sectional side view of a cross section of a waveguide comprising an irregular hexagonal geometry.

FIGS. 14A and 14B illustrate cross-sectional side views of a waveguide air space. The geometry illustrated in FIGS. 14A and 14B defines the interior air space wherein an electromagnetic signal may propagate through a waveguide. The geometry and dimensions of the waveguide cross-section may be optimized for propagating a certain mode of electromagnetic energy over an operational bandwidth. The waveguide cross-section may be implemented in a broader system that includes one or more radiating elements, H-plane combiners, and E-plane combiners.

The waveguide 1400 cross-sectional geometry illustrated in FIGS. 14A and 14B comprises an irregular hexagonal geometry that comprises at least one convex interior angle that is greater than 180°. In an implementation, the waveguide 1400 is one component of an antenna array. The antenna array includes a plurality of radiating elements for receiving or transmitting electromagnetic signals. The antenna array further includes a plurality of H-plane combiners and/or E-plane combiners for combining electromagnetic signals in a waveguide cavity. It should be appreciated that the "combiners" discussed herein may also function as splitters depending on the direction of travel of the electromagnetic signals. The cross-sectional geometry of the waveguide 1400 may be implemented within a combiner for guiding electromagnetic signals through the combiner. Additionally, the cross-sectional geometry of the waveguide 1400 may be implemented at the waveguide port wherein an electromagnetic signal may enter or exit the combiner. The waveguide 1400 allows operation in a single fundamental mode over an operational frequency bandwidth.

Like other figures depicted herein, the waveguide 1400 illustrated in FIGS. 14A-14B depicts hollow air space for propagating electromagnetic signals. The lines depicted in the figures herein illustrate the border between the hollow air space and the beginning of the metal structure. Thus, the lines depicted in the figures herein illustrate the edge of the metal structure and define the interior space of various structures within a waveguide as part of an antenna array, waveguide component, or waveguide assembly. The metal structures discussed herein are manufactured using metal additive (three-dimensional printing) manufacturing techniques.

The waveguide 1400 comprises an irregular hexagonal geometry. The irregular hexagonal geometry of the waveguide 1400 comprises six sides. The waveguide 1400 includes a plurality of sides. As shown in FIG. 14A, the waveguide 1400 includes a first side 1405A and a second side 1405B which are symmetrical with identical lengths. The waveguide 1400 further includes a third side 1405C and a fourth side 1405D which are also symmetrical with identical lengths. As shown in FIG. 14A, each of sides 1405A-1405D are symmetrical with identical lengths. However, as will be discussed in more detail below, the sides 1405A-1405D need not be symmetrical or have identical lengths. Each of the sides 1405A-1405D may have different lengths or some of the sides 1405A-1405D may have similar lengths while others of the sides 1405A-1405D may have different lengths.

The waveguide 1400 is referred to as an irregular hexagonal waveguide because the fifth side 1410A and the sixth side 1410B each have a length that is different from the sides 1405A-1405D. As shown in FIG. 14B, the fifth side 1410A and the sixth side 1410B have a same length that is shorter than a length of sides 1405A-1405D. It is conceivable that the fifth side 1410A and the sixth side 1410B may have a length that is longer than or the same length as the lengths of the sides 1405A-1405D.

The first side 1405A and the second side 1405B meet at a first-second corner 1406. The first-second corner 1406 comprises a first-second interior angle 1408 (i.e., interior to the hollow space defined by the waveguide 1400). The first-second interior angle 1408 comprises an angle from about 65° to about 110°. In an embodiment, the first-second angle 1408 is a 90° angle. The first-second interior angle 1408 allows first side 1405A and second side 1405B, both surfaces with overhang angles with respect to a build plate, to be optimally oriented for additive manufacturing. The third side 1405C and the fourth side 1405D meet at a third-fourth corner 1407. The third-fourth corner 1407 comprises a third-fourth interior angle 1409 (i.e., interior to the hollow space defined by the waveguide 1400). The third-fourth interior angle 1409 comprises an angle from about 220° to about 290°. In an embodiment, the third-fourth interior angle 1409 is a 270° angle.

The first side 1405A and the fifth side 1410A meet at a first-fifth corner 1411A. The first-fifth corner 1411A defines a first-fifth interior angle 1413A (i.e., interior to the hollow space defined by the waveguide 1400). The second side 1405B and the sixth side 1410B meet at a second-sixth corner 1411B. The second-sixth corner 1411B comprises a second-sixth interior angle 1413B (i.e., interior to the hollow space defined by the waveguide 1400). In an embodiment, the first-fifth interior angle 1413A is equivalent to the second-sixth interior angle 1413B.

The third side 1405C and the fifth side 1410A meet at a third-fifth corner 1412A. The third-fifth corner 1412A comprises a third-fifth interior angle 1414A (i.e., interior to the hollow space defined by the waveguide 1400). The fourth side 1405D and the sixth side 1410B meet at a fourth-sixth corner 1412B. The fourth-sixth corner 1412B comprises a fourth-sixth interior angle 1414B (i.e., interior to the hollow space defined by the waveguide 1400). In an embodiment, the third-fifth interior angle 1414A is equivalent to the fourth-sixth interior angle 1414B.

The cross-section of the waveguide 1400 comprises at least one convex interior angle (i.e., an angle greater than 180°). In the implementation illustrated in FIGS. 14A-14B, the waveguide 1400 comprises one convex interior angle, including the third-fourth angle 1409.

The waveguide 1400 enables numerous advantages over conventional waveguides and can be more easily created using metal additive manufacturing processes (e.g., three-dimensional printing) than, for example, a conventional rectangular waveguide. The waveguide 1400 allows an alternate electromagnetic field orientation than waveguides 100, 700, 800, 1000, 1100, and 1300, where the electric field orientation in waveguide 1400 is orthogonal in orientation to waveguides 100, 700, 800, 1000, 1100, and 1300. This is advantageous when creating antenna arrays, waveguide components, and waveguide assemblies with additive manufacturing.

Any of the edges or corners of the waveguide 1400 can be filleted during manufacturing to increase the structural durability of the antenna array or improve fidelity of the geometry during fabrication. Filleting is a rounding of an interior or exterior corner and may be implemented to create concave or convex functions within the antenna array. In an implementation, each corner of the waveguide 1400 is filleted during manufacturing by leveraging the three-dimensional metal additive manufacturing process.

FIG. 14B illustrates a cross-sectional view of the waveguide 1400 and further illustrates the overhang angle 1415 for the waveguide 1400 geometry. The waveguide 1400 is manufactured using metal additive manufacturing techniques in the positive z-axis (zenith) direction relative to a build plate. The overhang angle 1415 is measured on a downward-facing surface, which is a non-vertical surface of the waveguide 1400 that extends unsupported over an air volume. The overhang angle 1415 is defined by two vectors, including a first vector that is perpendicular to the surface of the waveguide 1400 and pointing into the air volume defined by the waveguide 1400; and a second vector that points in the negative z-axis (nadir) direction relative to the build direction. The overhang angle 1415 may comprise a 45° angle. The overhang angle 1415 may fall within a range from about 0° to about 90°. In an implementation, the overhang angles 1415 within the cross-section of the waveguide 1400 are all identical and comprise a 45°±25° angle. In an alternative implementation, the overhang angles 1415 within the cross-section of the waveguide 1400 are not all identical and each comprise a 45°±25° angle.

Figure 15A:
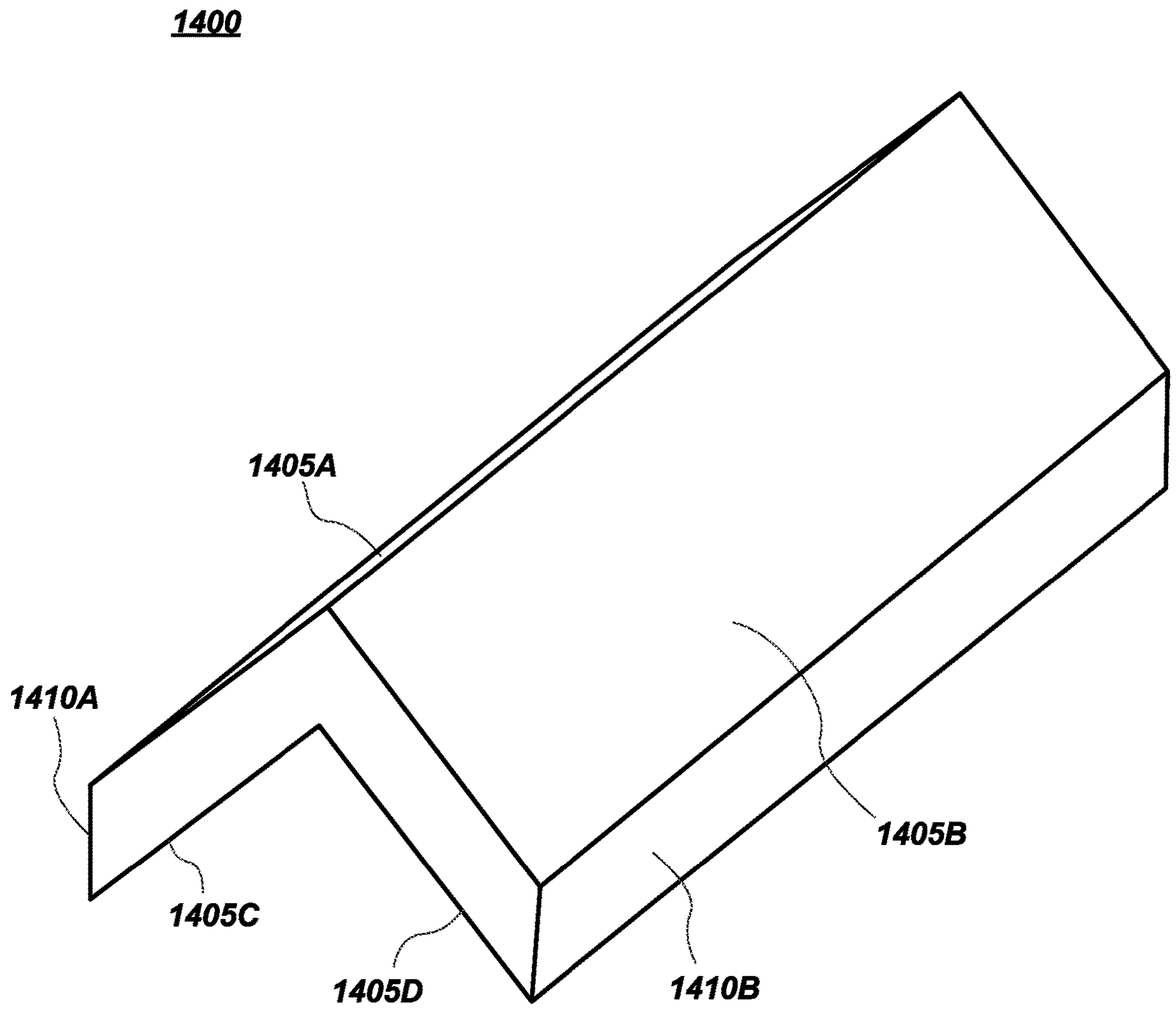
FIG. 15A illustrates a perspective view of an air space within a waveguide comprising a cross section with an irregular hexagonal geometry.
Figure 15B:
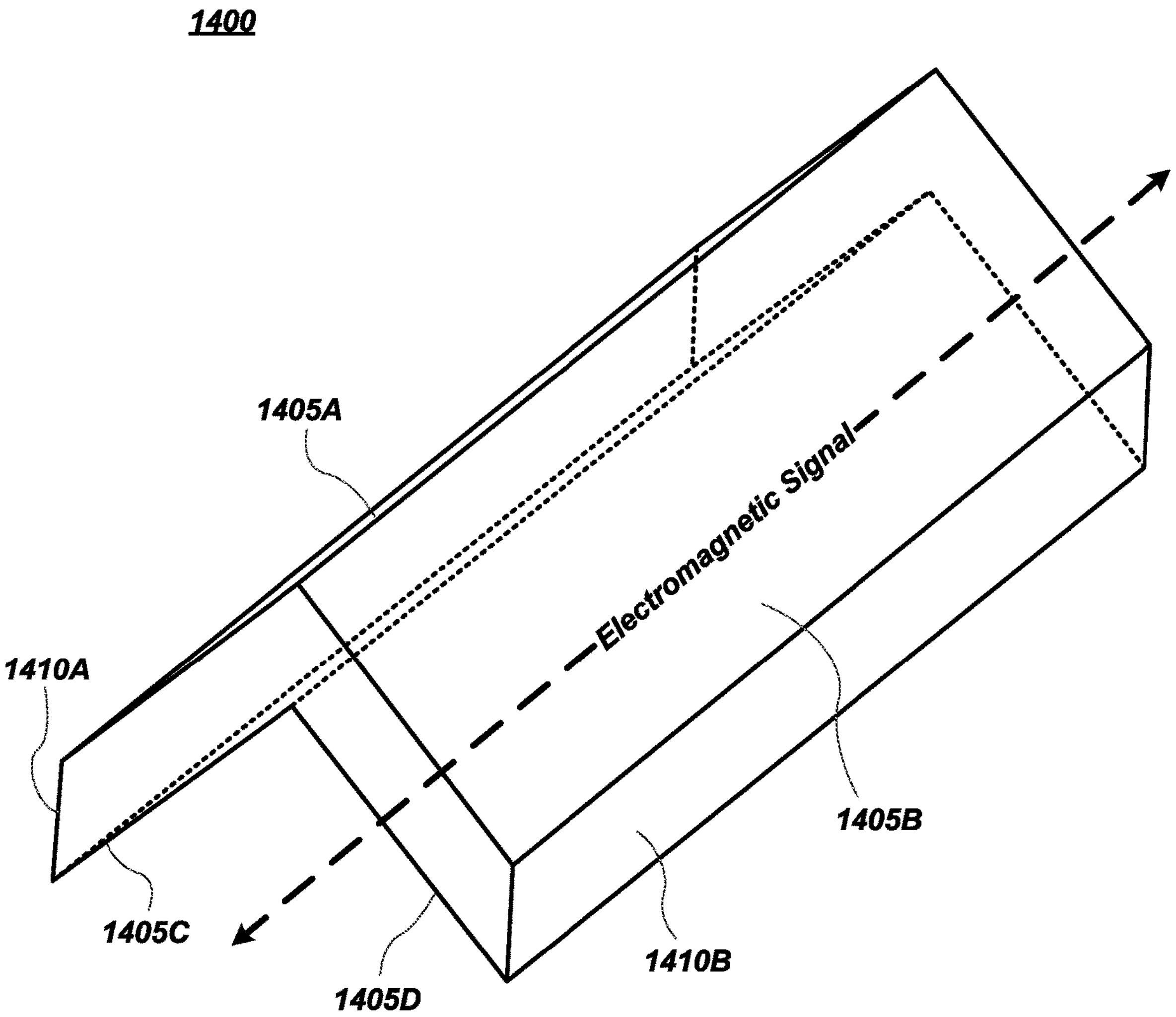
FIG. 15B illustrates a perspective view of an air space within a waveguide comprising a cross section with an irregular hexagonal geometry.

FIGS. 15A and 15B each illustrate a perspective view of the waveguide 1400. The waveguide 1400 comprises the same cross-sectional geometry illustrated in FIGS. 14A-14B. FIGS. 15A and 15B illustrate a perspective view of a length of the waveguide 1400, wherein an electromagnetic signal is propagated along the length of the waveguide 1400 and within the air space defined by the waveguide 1400 (as shown in FIG. 15B). FIG. 15A illustrates only an exterior view of the air space defined by the waveguide 1400 and FIG. 15B illustrates a see-through view of the air space defined by the waveguide 1400.

The waveguide 1400 may feed into a combiner such that the cross-sectional geometry of the waveguide 1400 is the cross-sectional geometry of a waveguide port associated with the combiner. The waveguide 1400 may propagate an electromagnetic signal into or away from the combiner depending on the direction of travel of the electromagnetic signal.

A single combiner may include at least three waveguide ports, including two or more waveguide ports that feed into the combiner and at least one waveguide port that propagates away from the combiner. It should be appreciated that the combiner may also function as a splitter depending on the direction of travel of the electromagnetic signals, and in this case, the combiner would include the at least one waveguide port for feeding into the combiner and the two or more waveguide ports for propagating away from the combiner. In an implementation, at least one of the waveguide ports of the combiner comprises a cross-section with one of the irregular hexagonal geometries discussed herein. The waveguide ports of the combiner may comprise different cross-sectional geometries depending on the implementation. In one implementation, the combiner comprises two or more waveguide ports comprising an irregular hexagonal cross-sectional geometry, and the combiner further comprises at least one waveguide port with a rectangular cross-sectional geometry. It should be appreciated that the combiner may include any number of waveguide ports depending on the implementation. Additionally, the waveguide ports may exclusively have an irregular hexagonal cross-sectional geometry, a rectangular cross-sectional geometry, a regular hexagonal cross-sectional geometry, and any combination of the aforementioned geometries.

It should be appreciated that an electromagnetic signal may propagate through the waveguide 1400 and/or a combiner structure in either direction. The combiner structure may be implemented within an antenna array, waveguide component, or waveguide assembly, and may receive electromagnetic signals and/or propagate electromagnetic signals reciprocally. The electromagnetic signals may propagate through the waveguides 1400 in either direction.

The cross-sectional geometry of the waveguide 1400 is optimized for metal additive manufacturing. The waveguide 1400 may be integrated within a combiner such that the waveguide 1400 protrudes in a positive z-axis direction with respect to a build orientation such that the overhang angles 1415 within the waveguide 1400 are oriented optimally for additive manufacturing. This may be referred to as a "tented geometry" as discussed herein, wherein the waveguide 1400 is "tented" relative to a positive z-axis build orientation. If the waveguide 1400 comprised a flatter geometry, then the combiner structure would be more challenging to manufacture using metal additive manufacturing techniques due to the overhang angles approaching 0°.

In an implementation, the waveguide 1400 is a component of a combiner structure and/or serves as the waveguide port of the combiner structure. The combiner structure is manufactured using three-dimensional metal additive manufacturing techniques, wherein the combiner structure is built upwards along the z-axis and relative to the build plate. The build plate is placed during the metal additive manufacturing process, and all components of an antenna array, waveguide component, or waveguide assembly, including, for example, radiating elements, combiners, filters, switches, and waveguides, are constructed using three-dimensional printing that builds upon the build plate in the positive z-axis. These components may be built as a single indivisible assembly that is inseparable and acts together to achieve a desired performance over an operational frequency bandwidth. The build plate may be removed after the antenna array is manufactured.

EXAMPLES

The following examples pertain to features of further embodiments:

Example 1 is a waveguide that comprises a hollow irregular hexagonal metal structure which receives an electromagnetic signal and propagates the signal through the hollow hexagonal metal structure.

Example 2 is the waveguide of example 1, wherein the irregular hexagonal metal structure includes at least two downward facing sides.

Example 3 is the waveguide of examples 1-2, wherein the two downward facing sides are unsupported.

Example 4 is the waveguide of example 1, wherein the irregular hexagon includes a first side, a second side, a third side, a fourth side, a fifth side, and a sixth side, where the first side, the second side, the fifth side and the sixth side have an equal length.

Example 5 is the waveguide of example 4, wherein the third side and the fourth side have an equal length.

Example 6 is the waveguide of examples 4-5, wherein the length of the third side and the fourth side is longer than the length of the first side, the second side, the fifth side, and the sixth side.

Example 7 is the waveguide of example 1, wherein the waveguide is a complex single-ridged the waveguide.

Example 8 is the waveguide of example 7, wherein the complex single-ridged the waveguide includes a complex side.

Example 9 is the waveguide of example 1, wherein the waveguide is a complex double-ridged the waveguide.

Example 10 is the waveguide of example 9, wherein the complex double-ridged the waveguide includes two complex sides.

Example 11 is the waveguide of example 1, wherein the waveguide includes a bend of 90°.

Example 12 is the waveguide of example 1, wherein the waveguide includes a bend with an angle of greater than 90°.

Example 13 is the waveguide of example 1, wherein the waveguide is formed using a metal additive manufacturing process.

Example 14 is the waveguide of example 13, wherein the waveguide is printed using the metal additive manufacturing process to include at least two unsupported downward facing surfaces.

Example 15 is the waveguide of examples 13-14, wherein the waveguide includes three unsupported downward facing surfaces.

Example 16 is the waveguide of examples 13-15, wherein the waveguide includes four unsupported downward facing surfaces.

Example 17 is the waveguide of examples 13-14, wherein the at least two unsupported downward facing surfaces are disposed with an overhang angle between 25° and 65° between surface normal and a negative z-axis vector.

Example 18 is the waveguide of examples 13-14 and 17, wherein the at least two unsupported downward facing surfaces are disposed with an overhang angle of 45°.

Example 19 is the waveguide of example 1, wherein the waveguide is symmetrical about a horizontal axis that bisects the waveguide.

Example 20 is the waveguide of example 1, wherein the waveguide includes one or more vertical sides.

Example 21 is a device. The device includes a waveguide, wherein the waveguide comprises a hollow structure for guiding an electromagnetic signal. The device is such that the waveguide comprises a cross-section with an irregular hexagonal geometry. The device is such that the irregular hexagonal geometry of the cross-section comprises at least one convex interior angle that is greater than 180°. The device is manufactured using metal additive manufacturing techniques.

Example 22 is a device as in Example 21, wherein the irregular hexagonal geometry comprises six sides, and wherein at least one of the six sides comprises a different length than another one of the six sides.

Example 23 is a device as in any of Examples 21-22, wherein the irregular hexagonal geometry comprises: a first side and a second side, wherein the first side and the second side comprise an equivalent length; a third side and a fourth side, wherein the third side and the fourth side comprise an equivalent length; and a fifth side and a sixth side, wherein the fifth side and the sixth side comprise an equivalent length; wherein a length of the fifth side and the sixth side is different from a length of the first side, the second side, the third side, and the fourth side.

Example 24 is a device as in any of Examples 21-23, wherein the irregular hexagonal geometry of the cross-section is such that: the first side and the second side meet at a corner; the third side and the fourth side meet at a corner; the first side is parallel to the third side; and the second side is parallel to the fourth side.

Example 25 is a device as in any of Examples 21-24, wherein the irregular hexagonal geometry of the cross-section is such that: the first side and the fifth side meet at a corner comprising a first concave interior angle; the third side and the fifth side meet at a corner comprising a second concave interior angle; the second side and the sixth side meet at a corner comprising a third concave interior angle; the fourth side and the sixth side meet at a corner comprising a fifth concave interior angle; and the third side and the fourth side meet at a corner comprising a first convex interior angle.

Example 26 is a device as in any of Examples 21-25, wherein the irregular hexagonal geometry is such that: the first side is parallel to the third side; the second side is parallel to the fourth side; and the fifth side is parallel to the sixth side.

Example 27 is a device as in any of Examples 21-26, wherein the irregular hexagonal geometry of the cross-section of the waveguide is optimized for metal additive manufacturing such that the waveguide can be manufactured together with a combiner as a single indivisible metal element.

Example 28 is a device as in any of Examples 21-27, further comprising a combiner, wherein the waveguide and the combiner are manufactured together as a single indivisible metal element such that the waveguide and the combiner do not need to be combined as separate components.

Example 29 is a device as in any of Examples 21-28, wherein the waveguide comprises at least two downward-facing surfaces relative to a build direction of the device, and wherein the device is manufactured using metal additive manufacturing with the build direction growing in a positive z-axis relative to a build plate.

Example 30 is a device as in any of Examples 21-29, wherein the two downward-facing surfaces are unsupported.

Example 31 is a device as in any of Examples 21-30, wherein respective lengths of two sides of the irregular hexagonal geometry are shorter than lengths of four sides of the irregular hexagonal geometry that are equal to each other.

Example 32 is a device as in any of Examples 21-31, wherein the device is manufactured by successively layering in a positive z-axis direction from a build plate.

Example 33 is a device as in any of Examples 21-32, wherein the waveguide comprises an overhang angle defined by two vectors comprising: a first vector that is perpendicular to a downward-facing side of the waveguide and points into a hollow interior space of the waveguide; and a second vector that points in a negative z-axis direction.

Example 34 is a device as in any of Examples 21-33, wherein the overhang angle is 45°.

Example 35 is a device as in any of Examples 21-34, wherein the overhang angle is within a range from about 20° to about 70°.

Example 36 is a device as in any of Examples 21-35, wherein the waveguide is a waveguide port of a combiner that comprises a plurality of waveguide ports, and wherein the plurality of waveguide ports of the combiner comprises: a first waveguide port comprising a cross-section with the irregular hexagonal geometry; a second waveguide port comprising a cross-section with the irregular hexagonal geometry; and a third waveguide port comprises a cross-section with a rectangular geometry.

Example 37 is a device as in any of Examples 21-36, a first interior angle and a second interior angle comprising a concave angle greater than 90°; and a third interior angle comprising the convex interior angle.

Example 38 is a device as in any of Examples 21-37, wherein the six interior angles further comprise: a fourth interior angle and a fifth interior angle comprising a second concave interior angle; and a sixth interior angle comprising a third concave interior angle; wherein the second concave interior angle is different from the third concave interior angle.

Example 39 is a device as in any of Examples 21-38, wherein the irregular hexagonal geometry of the cross-section of the waveguide is optimized for propagating a single mode electromagnetic signal over an operational frequency bandwidth.

Example 40 is a device as in any of Examples 21-39, wherein the at least one convex interior angle is within a range from about 220° to about 290°.

Example 41 is a device. The device includes a waveguide, wherein the waveguide comprises a hollow structure for guiding an electromagnetic signal. The device is such that the waveguide comprises a cross-section with an irregular hexagonal geometry. The device is such that the irregular hexagonal geometry of the cross-section comprises a plurality of internal angles. The device is such that each of the plurality of internal angles of the cross-section is a concave angle. The device is manufactured using metal additive manufacturing techniques.

Example 42 is a device as in Example 41, wherein the irregular hexagonal geometry comprises six sides, and wherein at least one of the six sides comprises a different length than another one of the six sides.

Example 43 is a device as in any of Examples 41-42, wherein the irregular hexagonal geometry comprises: a first side and a second side, wherein the first side and the second side comprise an equivalent length; a third side and a fourth side, wherein the third side and the fourth side comprise an equivalent length; and a fifth side and a sixth side, wherein the fifth side and the sixth side comprise different lengths relative to one another; wherein a length of the fifth side and the sixth side is different from a length of any of the first side, the second side, the third side, and the fourth side.

Example 44 is a device as in any of Examples 41-43, wherein the irregular hexagonal geometry of the cross-section is such that: first side meets at a corner with the fifth side; the second side meets at a corner with the fifth side; the third side meets at a corner with the sixth side; and the fourth side meets at a corner with the sixth side; wherein the fifth side is parallel to the sixth side.

Example 45 is a device as in any of Examples 41-44, wherein the irregular hexagonal geometry of the cross-section comprises six interior angles, and wherein the six interior angles comprise two each of three different angle dimensions.

Example 46 is a device as in any of Examples 41-45, wherein the plurality of interior angles comprises two or more angles comprising a dimension greater than 90°.

Example 47 is a device as in any of Examples 41-46, wherein the irregular hexagonal geometry of the cross-section of the waveguide is optimized for metal additive manufacturing such that the waveguide can be manufactured together with a combiner as a single indivisible metal element.

Example 48 is a device as in any of Examples 41-47, further comprising a combiner, wherein the waveguide and the combiner are manufactured together as a single indivisible metal element such that the waveguide and the combiner do not need to be combined as separate components.

Example 49 is a device as in any of Examples 41-48, wherein the waveguide comprises at least two downward-facing surfaces relative to a build direction of the device, and wherein the device is manufactured using metal additive manufacturing with the build direction growing in a positive z-axis relative to a build plate.

Example 50 is a device as in any of Examples 41-49, wherein the two downward-facing surfaces are unsupported.

Example 51 is a device as in any of Examples 41-50, wherein respective lengths of two parallel sides of the irregular hexagonal geometry of the cross-section are different.

Example 52 is a device as in any of Examples 41-51, wherein the irregular hexagonal geometry comprises six sides, and wherein at least four of the six sides comprise a different length.

Example 53 is a device as in any of Examples 41-52, wherein the device is manufactured by successively layering in a positive z-axis direction from a build plate.

Example 54 is a device as in any of Examples 41-53, wherein the waveguide comprises an overhang angle defined by two vectors comprising: a first vector that is perpendicular to a downward-facing side of the waveguide and points into a hollow interior space of the waveguide; and a second vector that points in a negative z-axis direction.

Example 55 is a device as in any of Examples 41-54, wherein the overhang angle is 45°.

Example 56 is a device as in any of Examples 41-55, wherein the overhang angle is within a range from about 20° to about 70°.

Example 57 is a device as in any of Examples 41-56, wherein the waveguide is a waveguide port of a combiner that comprises a plurality of waveguide ports, and wherein the plurality of waveguide ports of the combiner comprises: a first waveguide port comprising a cross-section with the irregular hexagonal geometry; a second waveguide port comprising a cross-section with the irregular hexagonal geometry; and a third waveguide port.

Example 58 is a device as in any of Examples 41-57, wherein the irregular hexagonal geometry of the cross-section of the waveguide is optimized for propagating a single mode electromagnetic signal over an operational frequency bandwidth.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device comprising:

a waveguide, wherein the waveguide comprises a hollow structure for guiding an electromagnetic signal;

wherein the waveguide comprises a cross-section with an irregular hexagonal geometry comprising six sides, and wherein at least one of the six sides comprises a different length than another one of the six sides;

wherein the six sides of the irregular hexagonal geometry comprises a first side and a second side meeting at a corner, and wherein a convex interior angle at the corner is greater than 180°;

wherein the irregular hexagonal geometry comprises six interior angles, and wherein the six interior angles comprise:

a first interior angle and a second interior angle comprising a concave angle greater than 90°;

a third interior angle comprising the convex interior angle, wherein the third interior angle is located at the corner where the first side meets the second side;

a fourth interior angle and a fifth interior angle comprising a second concave interior angle; and a sixth interior angle comprising a third concave interior angle;

wherein the second concave interior angle is different from the third concave interior angle; and wherein the device is manufactured using metal additive manufacturing techniques.

2. The device of claim 1, wherein the convex interior angle at the corner where the first side meets the second side is within a range from about 220° to about 290°.

3. The device of claim 1, wherein the irregular hexagonal geometry comprises:

wherein the first side and the second side each comprise a length, wherein the length of the first side and the second side is equivalent;

a third side and a fourth side, wherein the third side and the fourth side each comprise a length, wherein the length of the third side and the fourth side is equivalent; and a fifth side and a sixth side, wherein the fifth side and the sixth side each comprise a length, wherein the length of the fifth side and the sixth side is equivalent;

wherein the length of the fifth side and the length of sixth side are different from the length of the first side, the length of the second side, the length of the third side, and the length of the fourth side.

4. The device of claim 3, wherein the irregular hexagonal geometry of the cross-section is such that:

the third side and the fourth side meet at a third-fourth corner;

the first side is parallel to the third side; and the second side is parallel to the fourth side.

5. The device of claim 4, wherein the irregular hexagonal geometry of the cross-section is such that:

the first side and the fifth side meet at a first-fifth corner comprising a first concave interior angle;

the third side and the fifth side meet at third-fifth a corner comprising the second concave interior angle;

the second side and the sixth side meet at a second-sixth corner comprising the third concave interior angle; and the fourth side and the sixth side meet at a fourth-sixth corner comprising a fourth concave interior angle.

6. The device of claim 3, wherein the irregular hexagonal geometry is such that:

the first side is parallel to the third side;

the second side is parallel to the fourth side; and the fifth side is parallel to the sixth side.

7. The device of claim 1, wherein the waveguide comprises a plurality of waveguide ports, and wherein the plurality of waveguide ports comprises:

a first waveguide port comprising a cross-section with the irregular hexagonal geometry;

a second waveguide port comprising a cross-section with the irregular hexagonal geometry; and a third waveguide port.

8. The device of claim 1, wherein the irregular hexagonal geometry of the cross-section of the waveguide is optimized for propagating a single mode electromagnetic signal over an operational frequency bandwidth.

9. The device of claim 1, wherein the waveguide comprises at least two downward-facing surfaces relative to a build direction of the device, and wherein the device is manufactured using the metal additive manufacturing techniques with the build direction growing in a positive z-axis relative to a build plate.

10. The device of claim 9, wherein the two downward-facing surfaces are unsupported.

11. The device of claim 1, wherein respective lengths of two sides of the irregular hexagonal geometry are shorter than lengths of four sides of the irregular hexagonal geometry that are equal to each other.

12. The device of claim 1, wherein the device is manufactured using the metal additive manufacturing techniques by successively layering in a positive z-axis direction from a build plate.

13. The device of claim 1, wherein the waveguide comprises an overhang angle defined by two vectors comprising:

a first vector that is perpendicular to a downward-facing side of the waveguide and points into a hollow interior space of the waveguide; and a second vector that points in a negative z-axis direction.

14. The device of claim 13, wherein the overhang angle is 45°.

15. The device of claim 13, wherein the overhang angle is within a range from about 20° to about 70°.

16. A device comprising:

a waveguide, wherein the waveguide comprises a hollow structure for guiding an electromagnetic signal;

wherein the waveguide comprises a cross-section with an irregular hexagonal geometry comprising six sides, and wherein at least one of the six sides comprises a different length than another one of the six sides;

wherein the irregular hexagonal geometry of the cross-section comprises a plurality of interior angles, and wherein each of the plurality of interior angles is a concave angle that is less than 180';

wherein the irregular hexagonal geometry of the cross-section comprises at least two downward-facing surfaces relative to a build direction of the device; and wherein the device is manufactured using metal additive manufacturing techniques with the build direction growing in a positive z-axis relative to a build plate;

wherein the irregular hexagonal geometry comprises:

a first side;

a second side that meets the first side at a first-second corner, wherein the second side is a different length than the first side;

a third side;

a fourth side that meets the third side at a third-fourth corner, wherein the fourth side is a different length than the third side;

a fifth side disposed between the first side and the third side; and a sixth side disposed between the second side and the fourth side;

wherein the fifth side is oriented substantially parallel to the sixth side; and wherein the fifth side comprises a different length than the sixth side.

17. The device of claim 16, wherein the irregular hexagonal geometry is symmetrical about a centerline bisecting the waveguide, wherein the centerline is perpendicular to the fifth side and the sixth side.

18. The device of claim 16, wherein at least four of the plurality of interior angles are greater than 90°.

19. The device of claim 16, wherein at least two of the six sides are parallel to one another, and wherein the two parallel sides comprise different lengths.

20. The device of claim 16, wherein the waveguide comprises an overhang angle defined by two vectors comprising:

a first vector that is perpendicular to a downward-facing side of the waveguide and points into a hollow interior space of the waveguide; and a second vector that points in a negative z-axis direction;

wherein the overhang angle is within a range from about 20° to about 70°.

21. A device comprising:

a waveguide, wherein the waveguide comprises a hollow structure for guiding an electromagnetic signal;

wherein the waveguide comprises a cross-section with an irregular hexagonal geometry comprising six sides, and wherein at least one of the six sides comprises a different length than another one of the six sides;

wherein the six sides of the irregular hexagonal geometry comprises a first side and a second side meeting at a corner, and wherein a convex interior angle at the corner is greater than 180°;

wherein the first side and the second side each comprise a length, wherein the length of the first side and the second side is equivalent;

a third side and a fourth side, wherein the third side and the fourth side each comprise a length, wherein the length of the third side and the fourth side is equivalent; and a fifth side and a sixth side, wherein the fifth side and the sixth side each comprise a length, wherein the length of the fifth side and the sixth side is equivalent;

wherein the length of the fifth side and the length of sixth side are different from the length of the first side, the length of the second side, the length of the third side, and the length of the fourth side; and wherein the irregular hexagonal geometry of the cross-section is such that:

the third side and the fourth side meet at a third-fourth corner;

the first side is parallel to the third side; and the second side is parallel to the fourth side.

* * * * *